US008820636B2

(12) United States Patent
Jenkins et al.

(10) Patent No.: US 8,820,636 B2
(45) **Date of Patent: *Sep. 2, 2014**

(54) AUTOMATED BANKING MACHINE OPERATED RESPONSIVE TO DATA BEARING RECORDS WITH IMPROVED RESISTANCE TO FRAUD

(71) Applicant: Diebold Self-Service Systems division of Diebold, Incorporated, North Canton, OH (US)

(72) Inventors: Randall Jenkins, Orrville, OH (US); Songtao Ma, Wadsworth, OH (US); Natarajan Ramachandran, Uniontown, OH (US); Jeffery M Enright, Akron, OH (US); Dale H. Blackson, Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/871,829

(22) Filed: Apr. 26, 2013

(65) Prior Publication Data

US 2014/0151449 A1 Jun. 5, 2014

Related U.S. Application Data

(63) Continuation of application No. 13/555,256, filed on Jul. 23, 2012, now Pat. No. 8,430,305, which is a continuation of application No. 13/199,106, filed on Aug. 19, 2011, now Pat. No. 8,225,993, which is a continuation of application No. 12/288,333, filed on Oct. 17, 2008, now Pat. No. 8,002,176, which is a continuation-in-part of application No. 11/975,375, filed on Oct. 19, 2007, now Pat. No. 7,971,780, which is a continuation-in-part of application No. 11/454,257, filed on Jun. 16, 2006, now Pat. No. 7,316,348, which is a continuation of application No. 10/832,960, filed on Apr. 27, 2004, now Pat. No. 7,118,031, which is a continuation-in-part of application No. 10/601,813, filed on Jun. 3, 2003, now Pat. No. 7,240,827.

(60) Provisional application No. 61/000,215, filed on Oct. 24, 2007, provisional application No. 61/000,335, filed on Oct. 25, 2007, provisional application No. 60/853,098, filed on Oct. 20, 2006, provisional application No. 60/560,674, filed on Apr. 7, 2004, provisional application No. 60/429,478, filed on Nov. 26, 2002.

(51) Int. Cl.
*G06F 19/00* (2011.01)

(52) U.S. Cl.
USPC .......................................... 235/379; 235/380

(58) Field of Classification Search
USPC .................... 235/375, 379, 380; 902/8, 9, 14
See application file for complete search history.

(56) References Cited

U.S. PATENT DOCUMENTS 4,971,077 A * 11/1990 Dominguez et al. .......... 131/108
6,390,367 B1 * 5/2002 Doig ............................ 235/436

(Continued)

*Primary Examiner* — Daniel St.Cyr
(74) *Attorney, Agent, or Firm* — Black, McCuskey, Souers & Arbaugh, LPA

(57) ABSTRACT

A banking system machine is controlled responsive to data read from data bearing records. The machine includes a card reader, a keypad, a cash dispenser, a cash outlet, a deposit accepting opening, and other transaction locations that may be susceptible to the installation of fraud devices. An anti-fraud sensing system is associated with the machine to sense the probable installation of unauthorized devices on the machine. Such unauthorized devices may include fraudulent card reading devices, fraudulent keypad input intercepting devices, cash outlet trap devices, and deposit input diversion devices.

20 Claims, 19 Drawing Sheets

(56) References Cited

U.S. PATENT DOCUMENTS

| | | | | |
|---|---|---|---|---|
| 6,629,643 | B1 * | 10/2003 | Nagata et al. | 235/475 |
| 7,316,348 | B2 * | 1/2008 | Ramachandran et al. | 235/379 |
| 7,971,780 | B2 * | 7/2011 | Jenkins et al. | 235/379 |
| 8,002,176 | B2 * | 8/2011 | Jenkins et al. | 235/379 |
| 8,225,993 | B2 * | 7/2012 | Jenkins et al. | 235/379 |
| 8,430,305 | B2 * | 4/2013 | Jenkins et al. | 235/379 |

* cited by examiner

AUTOMATED BANKING MACHINE OPERATED RESPONSIVE TO DATA BEARING RECORDS WITH IMPROVED RESISTANCE TO FRAUD

CROSS REFERENCE TO RELATED APPLICATIONS

This application is a continuation of U.S. application Ser. No. 13/555,256 filed Jul. 23, 2012, now U.S. Pat. No. 8,430, 305, which is a continuation of U.S. application Ser. No. 13/199,106 filed Aug. 19, 2011, now U.S. Pat. No. 8,225,993, which is a continuation of U.S. application Ser. No. 12/288, 333 filed Oct. 17, 2008, now U.S. Pat. No. 8,002,176, which claims benefit pursuant to 35 U.S.C. §119(e) of U.S. Provisional Applications 61/000,215 filed Oct. 24, 2007 and 61/000,335 filed Oct. 25, 2007. Application Ser. No. 12/288, 333 is also a continuation-in-part of U.S. patent application Ser. No. 11/975,375 filed Oct. 19, 2007, now U.S. Pat. No. 7,971,780, which claims benefit pursuant to 35 U.S.C. §119 (e) of U.S. Provisional Application 60/853,098 filed Oct. 20, 2006. Application Ser. No. 11/975,375 is also a continuation-in-part of U.S. patent application Ser. No. 11/454,257 filed Jun. 16, 2006, now U.S. Pat. No. 7,316,348, which is a continuation of U.S. application Ser. No. 10/832,960 filed Apr. 27, 2004, now U.S. Pat. No. 7,118,031, which claims benefit pursuant to 35 U.S.C. §119(e) of U.S. Provisional Application 60/560,674 filed Apr. 7, 2004. Application Ser. No. 10/832,960 is also a continuation-in-part of U.S. patent application Ser. No. 10/601,813 filed Jun. 3, 2003, now U.S. Pat. No. 7,240,827, which claims benefit pursuant to 35 U.S.C. §119(e) of U.S. Provisional Application 60/429,478 filed Nov. 26, 2002. The disclosures of each of the above mentioned Applications are herein incorporated by reference in their entirety as if fully rewritten herein.

TECHNICAL FIELD

This invention relates to automated banking machines that operate responsive to data read from data bearing records such as user cards, and which may be classified in U.S. Class 235, Subclass 379.

BACKGROUND OF INVENTION

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine. An automated teller machine reads customer cards and enables customers to carry out banking transactions. Banking transactions carried out using automated teller machines may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to automatically carry out transactions involving transfers of value.

Automated banking machines may benefit from improvements.

OBJECTS OF EXEMPLARY EMBODIMENTS

It is an object of an exemplary embodiment to provide an automated banking machine that operates responsive to data bearing records.

It is a further object of an exemplary embodiment to provide an automated banking machine that facilitates the detection of fraudulent activity which may be attempted at the machine.

It is a further object of an exemplary embodiment to provide an automated banking machine which improved capabilities.

It is a further object of an exemplary embodiment to provide an automated banking machine which reduces the risk of unauthorized access to devices and operations of the machine.

Further objects of exemplary embodiments will be made apparent in the following Description of Exemplary Embodiments and the appended claims.

The foregoing objects are accomplished in some exemplary embodiments by a card activated automated banking machine which comprises an automated teller machine (ATM). The ATM includes a plurality of transaction function devices. The devices include a card reader that is operative to read data included on cards of machine users. In the exemplary embodiment the transaction function devices include input and output devices which are part of a user interface. In the exemplary embodiment the transaction function devices also include devices for carrying out types of banking transactions such as a currency dispenser device and a deposit accepting device. The exemplary ATM also includes at least one computer which is referred to herein as a processor or controller, and which is operative to cause the operation of the transaction function devices in the machine.

In an exemplary embodiment the ATM includes a housing with a secure chest portion and an upper housing area. The chest portion houses certain transaction function devices such as the currency dispenser device. For purposes of this disclosure a cash dispenser or currency dispenser shall be construed to mean a mechanism that makes cash stored in the machine accessible to users from outside the machine. The chest portion includes a chest door which is generally secured but which is capable of being opened when unlocked by authorized persons.

In some exemplary embodiments during operation of the ATM, the transaction areas are illuminated to facilitate operation of the machine by users. In an exemplary embodiment the controller of the ATM is operative to illuminate the transaction areas at those times when the user would be expected to receive or place items in such transaction areas during the conduct of transactions. This facilitates guiding the user to the particular transaction area on the machine even when the machine is being operated during daylight hours.

In some exemplary embodiments the capability of illuminating selected areas of the machine during certain transaction steps may be utilized in conjunction with anti-fraud devices. In an exemplary embodiment anti-fraud devices are used to reduce the risk that an unauthorized card reading device is installed externally of the machine adjacent to the card reader slot of the machine fascia. Criminals are sometimes ingenious and in the past some have produced reading devices that can intercept magnetic stripe data on cards that are being input to an ATM by a consumer. By intercepting this data, criminals may be able to conduct unauthorized transactions with the consumer's card number. Such external reading devices may be made to appear to be a part of the normal ATM fascia.

In an exemplary embodiment the housing in surrounding relation of the card reader slot is illuminated responsive to operation of the controller. In some exemplary machines the housing is operative to illuminate an area generally entirely surrounding the slot so as to make it more readily apparent to a user that an unauthorized modification or attachment to the fascia may have been made.

In some exemplary embodiments during normal operation, the illumination of the area surrounding the fascia card slot is operative to help to guide the user to the slot during transactions when a user is required to input or take their card. The exemplary ATM is provided with radiation sensing devices positioned adjacent to the illumination devices that are operative to illuminate the area surrounding the card reader slot. The exemplary controller is programmed to sense changes in the magnitude of radiation sensed by the one or more radiation sensing devices. The installation of an unauthorized card reading device in proximity to the card reading slot generally produces a change in the magnitude of the radiation sensed by the radiation sensing devices. The exemplary controller is programmed to recognize such changes and to take appropriate action in response thereto so as to reduce the possibility of fraud. Such action may include in some exemplary embodiments, the machine sending a status message through a network to a person to be notified of a possible fraud condition. Such actions may also include in some embodiments, warning the user of the machine to look for the installation of a possible fraud device. Of course these approaches are exemplary and in other embodiments other approaches may be used.

In some exemplary embodiments sensing devices may be provided in proximity to the keypad used by the customer to provide inputs, such as a personal identification number (PIN). Such sensors may be of the radiation sensing type or other type. Such sensors are adapted to sense the installation of unauthorized input intercepting devices above or adjacent to the keypad. The sensing of such an unauthorized device may cause an exemplary controller in the machine to give notice of the potential fraud device and/or to cease or modify the operation of the machine to reduce the risk of interception of customer inputs. In some exemplary embodiments radiation emitting devices used for sensing may provide outputs of visible light and may be used to guide a user at appropriate times during transactions to provide inputs to the keypad.

As will be appreciated, the foregoing objects and examples are exemplary. Additional aspects and embodiments within the scope of the claims may be devised by those having skill in the art based on the teachings set forth herein.

DESCRIPTION OF EXEMPLARY EMBODIMENTS

Figure 1:
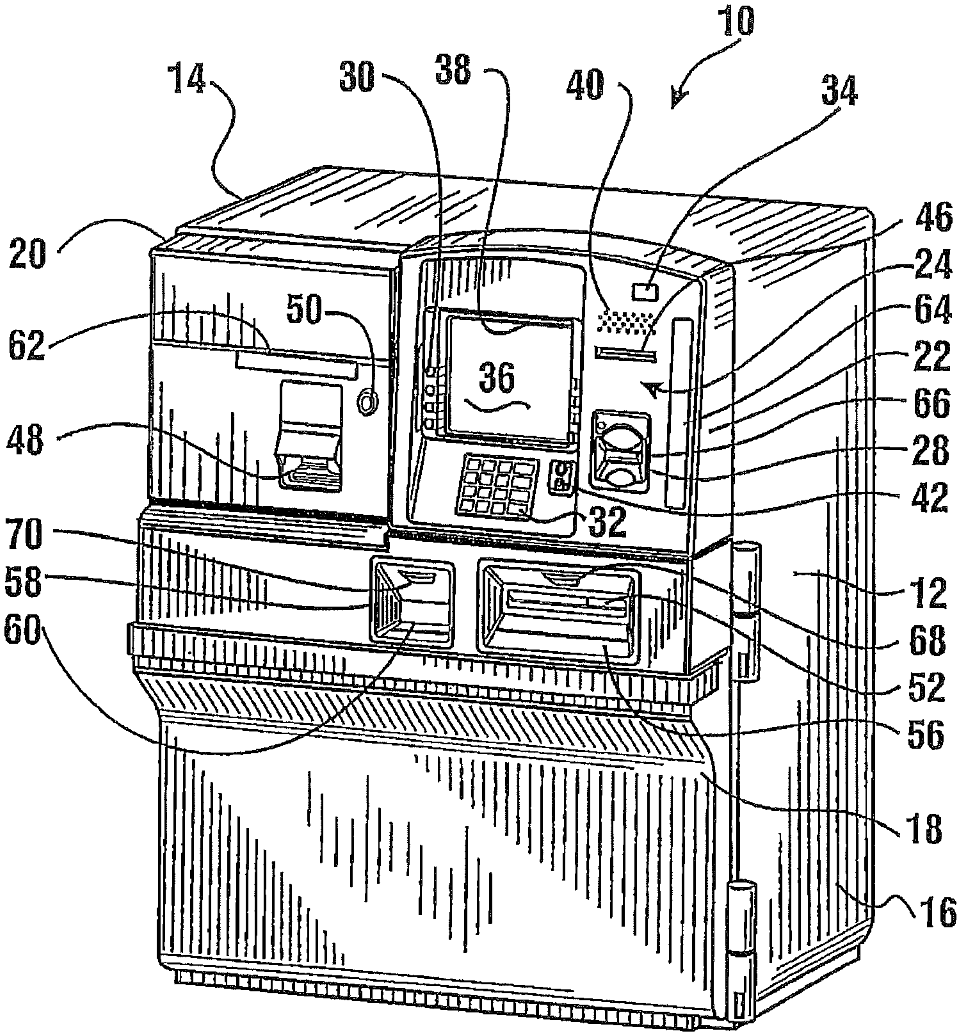
FIG. 1 is an isometric external view of an exemplary automated banking machine which is an ATM and which incorporates some aspects and features of embodiments described in the present application.

Referring now to the drawings and particularly to FIG. 1, there is shown therein an exemplary embodiment of an automated banking machine generally indicated 10. In the exemplary embodiment automated banking machine 10 is a drive up ATM, however the features described and claimed herein are not necessarily limited to ATMs of this type. The exemplary ATM includes a housing 12. Housing 12 includes an upper housing area 14 and a secure chest area 16 in a lower portion of the housing. Access to the chest area 16 is controlled by a chest door 18 which when unlocked by authorized persons in the manner later explained, enables gaining access to the interior of the chest area.

The exemplary ATM 10 further includes a first fascia portion 20 and a second fascia portion 22. Each of the fascia portions is movably mounted relative to the housing as later explained, which in the exemplary embodiment facilitates servicing.

The ATM includes a user interface generally indicated 24. The exemplary user interface includes input devices such as a card reader 26 (shown in FIG. 3) which is in connection with a card reader slot 28 which extends in the second fascia portion. The card reader is operative to read data bearing records presented by machine users. Such records can include data corresponding to at least one of the associated user, one or more user financial accounts and/or other data. In some exemplary embodiments the card reader may read the data from magnetic stripe cards. In other exemplary embodiments the card reader may be operative to read data from other card or record types such as contactless cards. Of course these approaches are exemplary. Other input devices of the exemplary user interface 24 include function keys 30 and a keypad 32. The exemplary ATM 10 also includes a camera 34 which also may serve as an input device for biometric features and the like. The exemplary user interface 24 also includes output devices such as a display 36. Display 36 is viewable by an operator of the machine when the machine is in the operative condition through an opening 38 in the second fascia portion 22. Further output devices in the exemplary user interface include a speaker 40. A headphone jack 42 also serves as an output device. The headphone jack may be connected to a headphone provided by a user who is visually impaired to provide the user with voice guidance in the operation of the machine. The exemplary machine further includes a receipt printer 44 (see FIG. 3) which is operative to provide users of the machine with receipts for transactions conducted. Transaction receipts are provided to users through a receipt delivery slot 46 which extends through the second fascia portion. Exemplary receipt printers that may be used in some embodiments are shown in U.S. Pat. No. 5,729,379 and U.S. Pat. No. 5,850,075, the disclosures of which are incorporated by reference herein. It should be understood that these input and output devices of the user interface 24 are exemplary and in other embodiments, other or different input and output devices may be used.

In the exemplary embodiment the second fascia portion has included thereon a deposit envelope providing opening 48. Deposit envelopes may be provided from the deposit envelope providing opening to users who may place deposits in the machine. The second fascia portion 20 also includes a fascia lock 50. Fascia lock 50 is in operative connection with the second fascia portion and limits access to the portion of the interior of the upper housing behind the fascia to authorized persons. In the exemplary embodiment fascia lock 50 comprises a key type lock. However, in other embodiments other types of locking mechanisms may be used. Such other types of locking mechanisms may include for example, other types of mechanical and electronic locks that are opened in response to items, inputs, signals, conditions, actions or combinations or multiples thereof.

The exemplary ATM 10 further includes a delivery area 52. Delivery area 52 is in connection with a currency dispenser device 54 which is alternatively referred to herein as a cash dispenser, which is positioned in the chest portion and is shown schematically in FIG. 3. The delivery area 52 is a transaction area on the machine in which currency sheets are delivered to a user. In the exemplary embodiment the delivery area 52 is positioned and extends within a recessed pocket 56 in the housing of the machine.

ATM 10 further includes a deposit acceptance area 58. The deposit acceptance area is an area through which deposits such as deposit envelopes to be deposited by users are placed in the machine. The deposit acceptance area 58 is in operative connection with a deposit accepting device positioned in the chest area 16 of the ATM. Exemplary types of deposit accepting devices are shown in U.S. Pat. No. 4,884,769 and U.S. Pat. No. 4,597,330, the disclosures of which are incorporated herein by reference.

In the exemplary embodiment the deposit acceptance area serves as a transaction area of the machine and is positioned and extends within a recessed pocket 60. It should be understood that while the exemplary embodiment of ATM 10 includes an envelope deposit accepting device and a currency sheet dispenser device, other or different types of transaction function devices may be included in automated banking machines. These may include for example, check and/or money order accepting devices, ticket accepting devices, stamp accepting devices, card dispensing devices, money order dispensing devices and other types of devices which are operative to carry out transaction functions.

In the exemplary embodiment the ATM 10 includes certain illuminating devices which are used to illuminate transaction areas, some of which are later discussed in detail. First fascia portion 20 includes an illumination panel 62 for illuminating the deposit envelope providing opening. Second fascia portion 22 includes an illumination panel 64 for illuminating the area of the receipt delivery slot 46 and the card reader slot 28. Further, an illuminated housing 66 later discussed in detail, bounds the card reader slot 28. Also, in the exemplary embodiment an illuminating window 68 is positioned in the recessed pocket 56 of the delivery area 52. An illuminating window 70 is positioned in the recessed pocket 60 of the deposit acceptance area 58. It should be understood that these structures and features are exemplary and in other embodiments other structures and features may be used.

Figure 3:
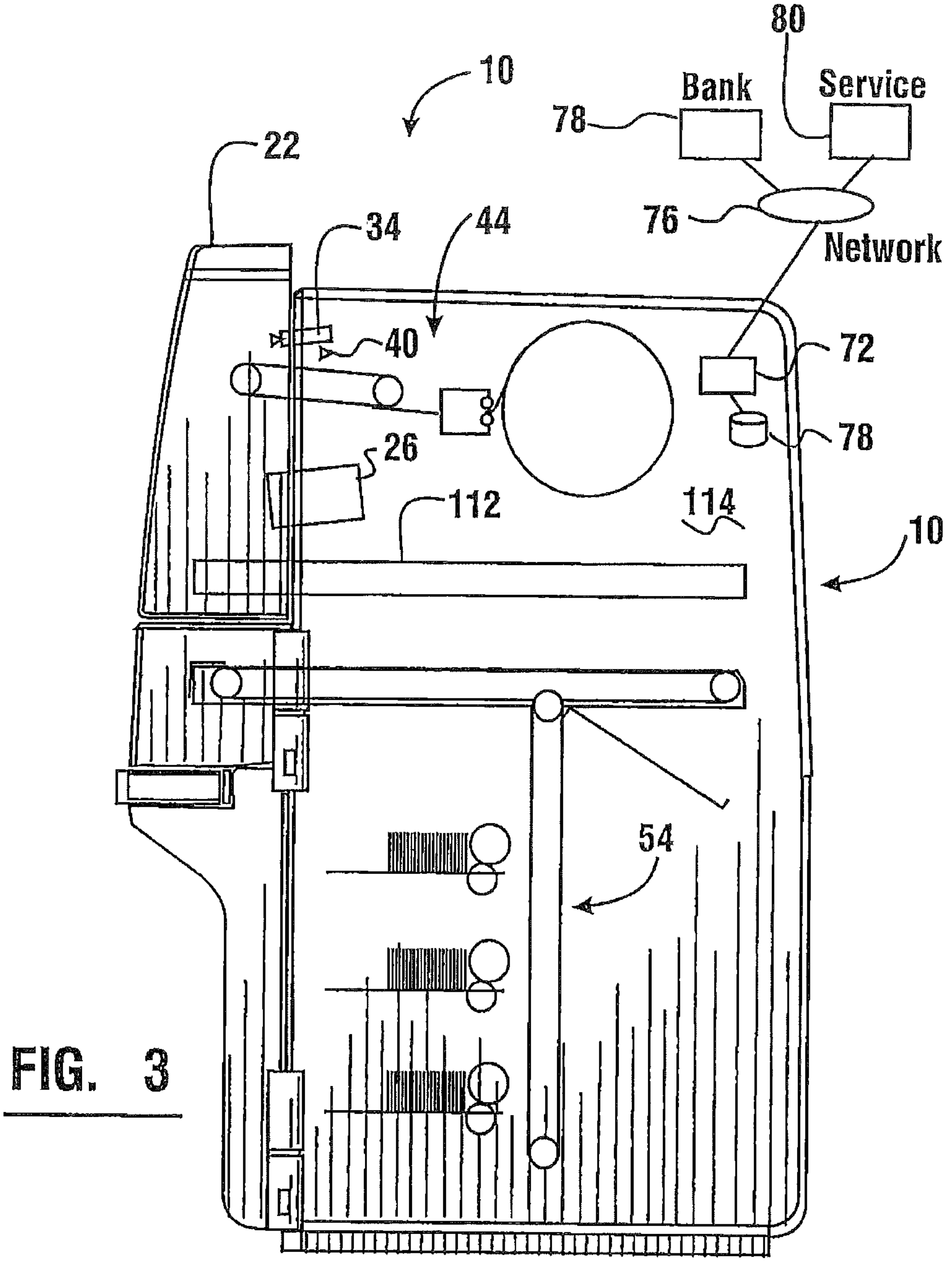
FIG. 3 is a transparent side view showing schematically some internal features of the ATM.

As schematically represented in FIG. 3, the ATM 10 includes one or more internal computers which are alternatively referred to herein as controllers. Such internal computers include one or more processors. Such processors may be in operative connection with one or more data stores. In some embodiments processors may be located on certain devices within the ATM so as to individually control the operation thereof. Examples such as multi-tiered processor systems are shown in U.S. Pat. No. 6,264,101 and U.S. Pat. No. 6,131,809, the disclosures of which are incorporated herein by reference.

For purposes of simplicity, the exemplary embodiment will be described as having a single controller which controls the operation of devices within the machine. However it should be understood that such reference shall be construed to encompass multicontroller and multiprocessor systems as may be appropriate in controlling the operation of a particular machine. In FIG. 3 the controller is schematically represented 72. Also as schematically represented, the controller is in operative connection with one or more data stores 78. Such data stores in exemplary embodiments are operative to store program instructions, values and other information used in the operation of the machine. Although the controller is schematically shown in the upper housing portion of ATM 10, it should be understood that in alternative embodiments controllers may be located within various portions of the automated banking machine.

In order to conduct transactions the exemplary ATM 10 communicates with remote computers. The remote computers are operative to exchange messages with the machine and authorize and record the occurrence of various transactions. This is represented in FIG. 3 by the communication of the machine through a network with a bank 78, which has at least one computer which is operative to exchange messages with the ATM through a network. For example, the bank 78 may receive one or more messages from the ATM requesting authorization to allow a customer to withdraw $200 from the customer's account. The remote computer at the bank 78 will operate to determine that such a withdrawal is authorized and will return one or more messages to the machine through the network authorizing the transaction. In exemplary embodiments at least one processor in the ATM is operative to cause the communication of data corresponding to data read from a user's card from the ATM to the remote computer as part of one or more messages. The ATM may also communicate other data corresponding to user inputs such as a personal identification number (PIN) and requested transaction data to the remote computer. The remote computer operates to compare the data corresponding to card data and/or PIN data to data corresponding to authorized users stored in at least one data store associated with the remote computer. Responsive to the data corresponding to an authorized user and a permissible transaction request, the remote computer communicates at least one message to the ATM which corresponds to authorization to carry out the requested transaction. After the ATM conducts the functions to accomplish a transaction such as dispensing cash, the ATM will generally send one or more messages back through the network to the bank indicating that the transaction was successfully carried out. Of course these messages are merely exemplary.

It should be understood that in some embodiments the ATM may communicate with other entities and through various networks. For example as schematically represented in FIG. 3, the ATM will communicate with computers operated by service providers 80. Such service providers may be entities to be notified of status conditions or malfunctions of the ATM as well as entities who are to be notified of corrective actions. An example of such a system for accomplishing this is shown in U.S. Pat. No. 5,984,178, the disclosure of which is incorporated herein by reference. Other third parties who may receive notifications from exemplary ATMs include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. Various types of messages may be provided to remote systems and entities by the machine depending on the capabilities of the machines in various embodiments and the types of transactions being conducted.

Figure 4:
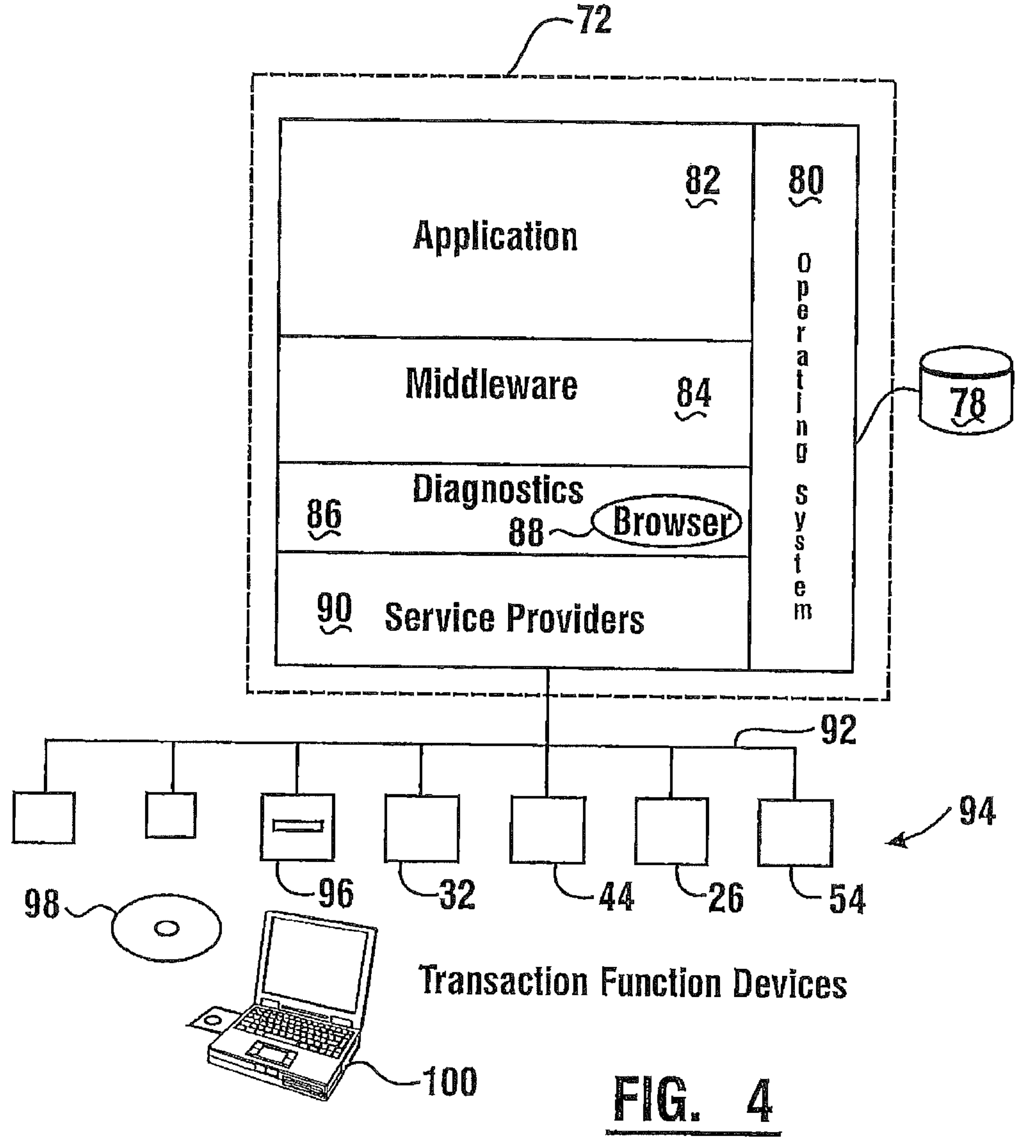
FIG. 4 is a schematic view representative of the software architecture of an exemplary embodiment.

FIG. 4 shows schematically an exemplary software architecture which may be operative in the controller 72 of machine 10. The exemplary software architecture includes an operating system such as for example Microsoft® Windows, IBM OS/2® or Linux. The exemplary software architecture also includes an ATM application 82. The exemplary application includes the instructions for the operation of the automated banking machine and may include, for example, an Agilis® 91x application that is commercially available from Diebold, Incorporated which is a cross vendor software application for operating ATMs. Further examples of software applications which may be used in some embodiments are shown in U.S. Pat. Nos. 6,289,320 and 6,505,177, the disclosures of which are incorporated herein by reference.

In the exemplary embodiment middleware software schematically indicated 84 is operative in the controller. In the exemplary embodiment the middleware software operates to compensate for differences between various types of automated banking machines and transaction function devices used therein. The use of a middleware layer enables the more ready use of an identical software application on various types of ATM hardware. In the exemplary embodiment the middleware layer may be Involve® software which is commercially available from Nexus Software, a wholly owned subsidiary of the assignee of the present invention.

The exemplary software architecture further includes a diagnostics layer 86. The diagnostics layer 86 is operative as later explained to enable accessing and performing various diagnostic functions of the devices within the ATM. In the exemplary embodiment the diagnostics operate in conjunction with a browser schematically indicated 88.

The exemplary software architecture further includes a service provider layer schematically indicated 90. The service provider layer may include software such as WOSA XFS service providers for J/XFS service providers which present a standardized interface to the software layers above and which facilitate the development of software which can be used in conjunction with different types of ATM hardware. Of course this software architecture is exemplary and in other embodiments other architectures may be used.

As schematically represented in FIG. 4, a controller 72 is in operative connection with at least one communications bus 92. The communications bus may in some exemplary embodiments be a universal serial bus (USB) or other standard or nonstandard type of bus architecture. The communications bus 92 is schematically shown in operative connection with transaction function devices 94. The transaction function devices include devices in the ATM which are used to carry out transactions. These may include for example the currency dispenser device 54, card reader 26, receipt printer 44, keypad 32, as well as numerous other devices which are operative in the machine and controlled by the controller to carry out transactions. In the exemplary embodiment one of the transaction function devices in operative connection with the controller is a diagnostic article reading device 96 which may be operative to read a diagnostic article schematically indicated 98 which may provide software instructions useful in servicing the machine. Alternatively and/or in addition, provision may be made for connecting the bus 92 or other devices in the machine computer device 100 which may be useful in performing testing or diagnostic activities related to the ATM.

Figure 5:
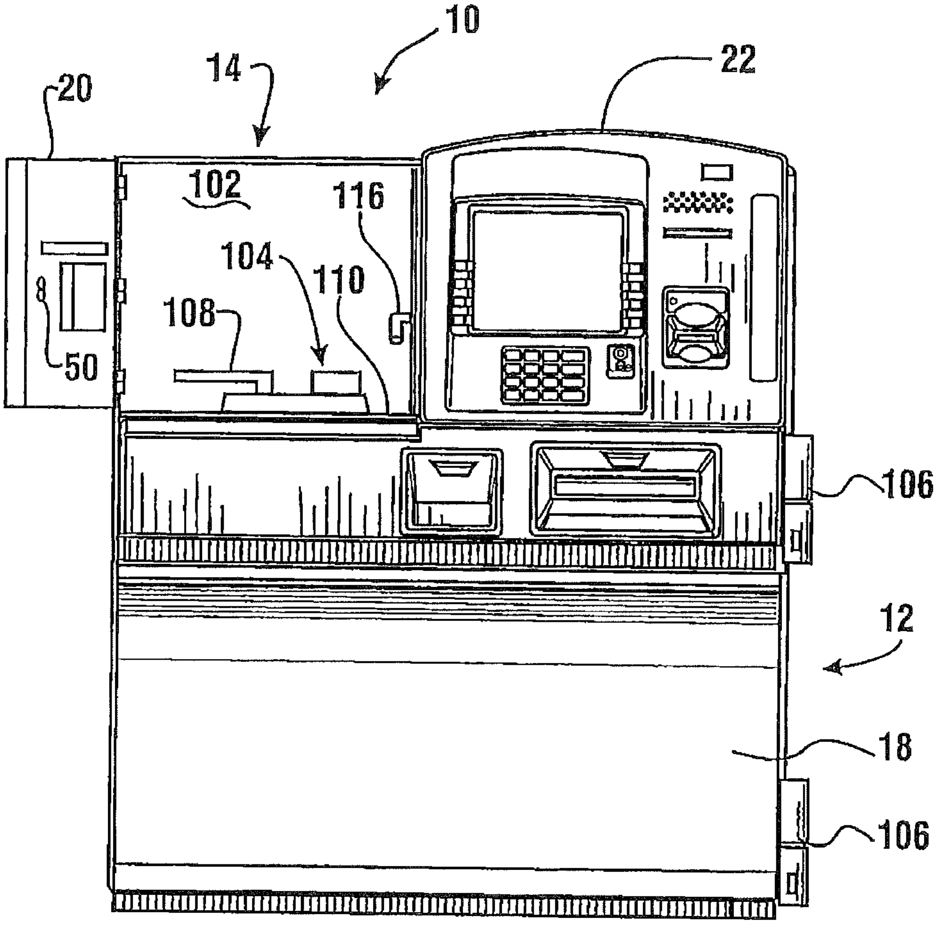
FIG. 5 is a front view showing the fascia portion moved to access a first portion of an upper housing of the machine.

In the exemplary embodiment of ATM 10 the first fascia portion 20 and the second fascia portion 22 are independently movably mounted on the ATM housing 12. This is accomplished through the use of hinges attached to fascia portion 20. The opening of the fascia lock 50 on the first fascia portion 20 enables the first fascia portion to be moved to an open position as shown in FIG. 5. In the open position of the first fascia portion an authorized user is enabled to gain access to a first portion 102 in the upper housing area 14. In the exemplary embodiment there is located within the first portion 102 a chest lock input device 104. In this embodiment the chest lock input device comprises a manual combination lock dial, electronic lock dial or other suitable input device through which a combination or other unlocking inputs or articles may be provided. In this embodiment, input of a proper combination enables the chest door 18 to be moved to an open position by rotating the door about hinges 106. In the exemplary embodiment the chest door is opened once the proper combination has been input by manipulating a locking lever 108 which is in operative connection with a boltwork. The boltwork which is not specifically shown, is operative to hold the chest door in a locked position until the proper combination is input. Upon input of the correct combination the locking lever enables movement of the boltwork so that the chest door can be opened. The boltwork also enables the chest door to be held locked after the activities in the chest portion have been conducted and the chest door is returned to the closed position. Of course in other embodiments other types of mechanical or electrical locking mechanisms may be used. In the exemplary embodiment the chest lock input device 104 is in supporting connection with a generally horizontally extending dividing wall 110 which separates the chest portion from the upper housing portion. Of course this housing structure is exemplary of ATM housing structures and in other embodiments other approaches may be used.

An authorized servicer who needs to gain access to an item, component or device of the ATM located in the chest area may do so by opening the fascia lock and moving the first fascia portion 20 so that the area 102 becomes accessible. Thereafter the authorized servicer may access and manipulate the chest lock input device to receive one or more inputs, which if appropriate enables unlocking of the chest door 18. The chest door may thereafter be moved relative to the housing and about its hinges 106 to enable the servicer to gain access to items, devices or components within the chest. These activities may include for example adding or removing currency, removing deposited items such as envelopes or checks, or repairing mechanisms or electrical devices that operate to enable the machine to accept deposited items or to dispense currency. When servicing activity within the chest is completed, the chest door may be closed and the locking lever 108 moved so as to secure the boltwork holding the chest door in a closed position. Of course this structure and service method is exemplary and in other embodiments other approaches may be used.

In the exemplary embodiment the second fascia portion 22 is also movable relative to the housing of the machine. In the exemplary embodiment the second fascia portion 22 is movable in supporting connection with a rollout tray 112 schematically shown in FIG. 3. The rollout tray is operative to support components of the user interface thereon as well as the second fascia portion. The rollout tray enables the second fascia portion to move outward relative to the ATM housing thereby exposing components and transaction function devices supported on the tray and providing access to a second portion 114 within the upper housing and positioned behind the second fascia portion. Thus as can be appreciated, when the second fascia portion is moved outward, the components on the tray are disposed outside the housing of the machine so as to facilitate servicing, adjustment and/or replacement of such components. Further components which remain positioned within the housing of the machine as the rollout tray is extended become accessible in the second portion as the second fascia portion 22 is disposed outward and away from the housing.

Figure 2:
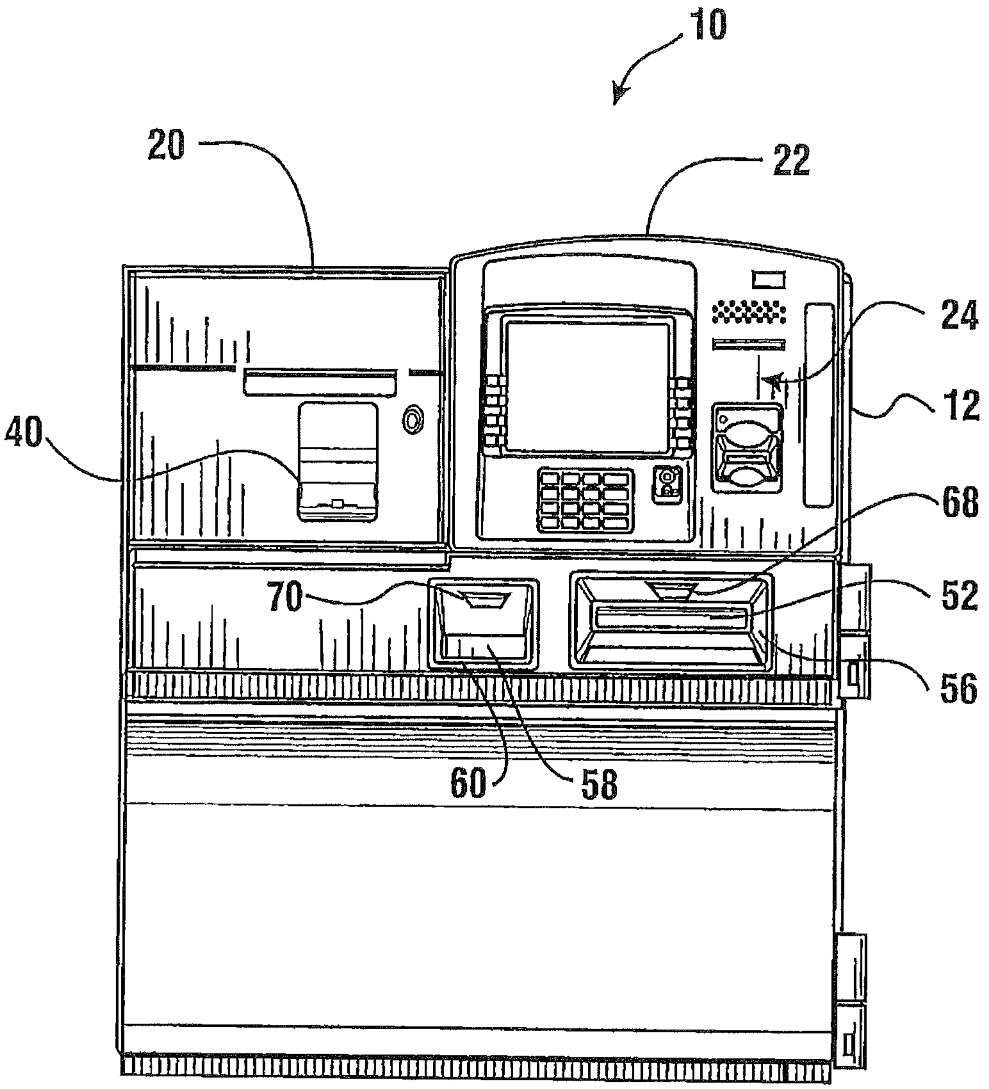
FIG. 2 is a front plan view of the ATM shown in FIG. 1.

In the exemplary embodiment the rollout tray 112 is in operative connection with a releasable locking device. The locking device is generally operative to hold the tray in a retracted position such that the second fascia portion remains in an operative position adjacent to the upper housing area as shown in FIGS. 1, 2 and 3. This releasable locking mechanism may comprise one or more forms of locking type devices. In the exemplary embodiment the releasable locking mechanism may be released by manipulation of an actuator 116 which is accessible to an authorized user in the first portion 102 of the upper housing 14. As a result an authorized servicer of the machine is enabled to move the second fascia portion outward for servicing by first accessing portion 102 in the manner previously discussed. Thereafter by manipulating the actuator 116 the second fascia portion is enabled to move outward as shown in phantom in FIG. 8 so as to facilitate servicing components on the rollout tray. Such components may include for example a printer or card reader. After such servicing the second fascia portion may be moved toward the housing so as to close the second portion 114. Such movement in the exemplary embodiment causes the rollout tray to be latched and held in the retracted position without further manipulation of the actuator. However, in other embodiments other types of locking mechanisms may be used to secure the rollout tray in the retracted position. It should be understood that this approach is exemplary and in other embodiments other approaches may be used.

Figure 6:
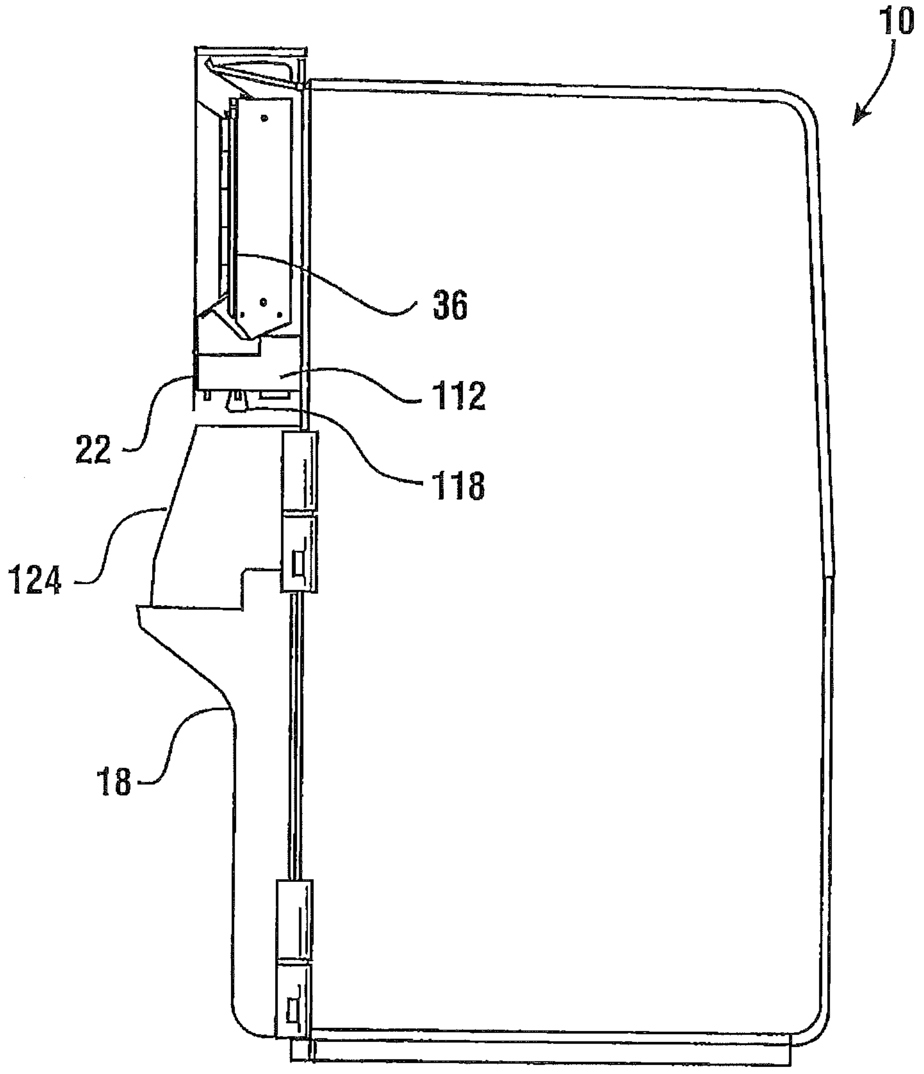
FIG. 6 is a partially transparent side view showing air flow through an air cooling opening of the machine.
Figure 7:
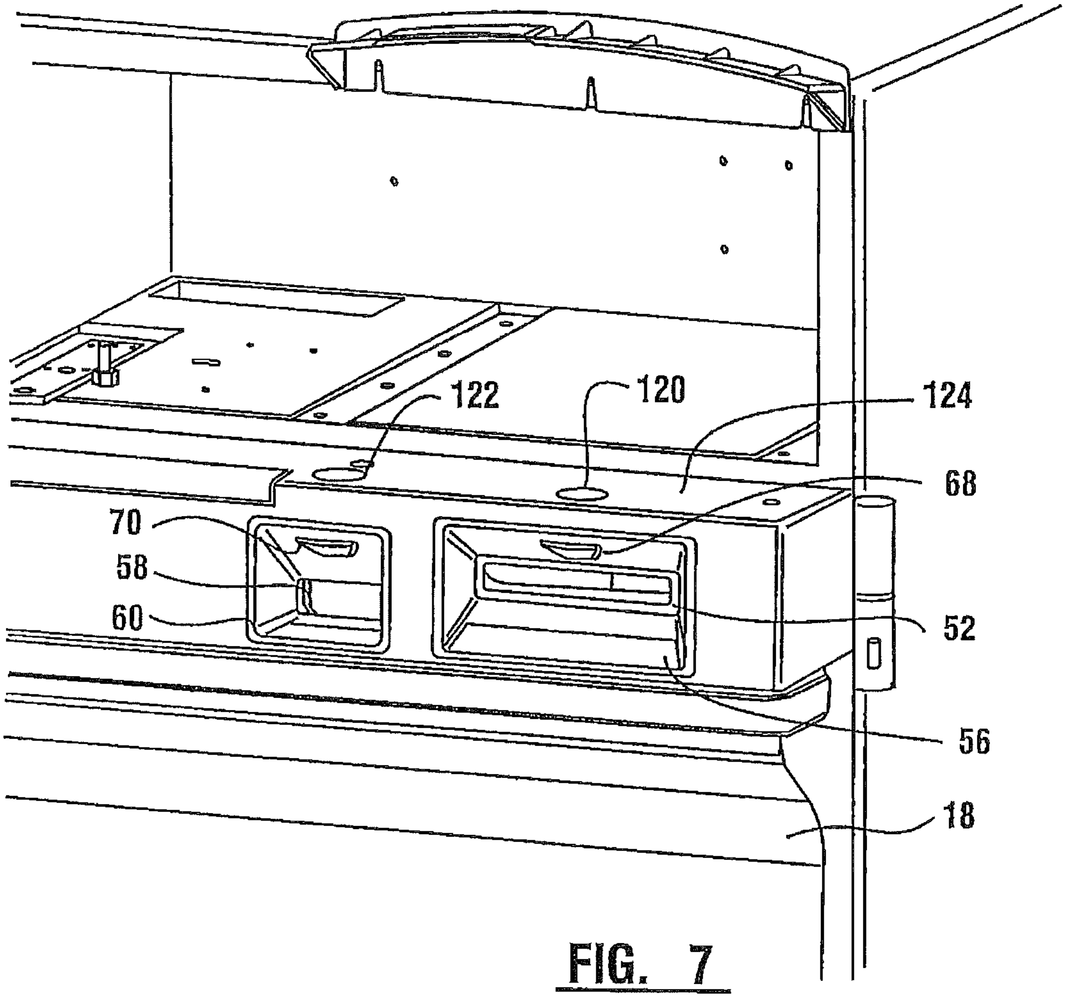
FIG. 7 is an isometric view of the ATM shown in FIG. 1 with the components of the upper housing portion removed.
Figure 10:
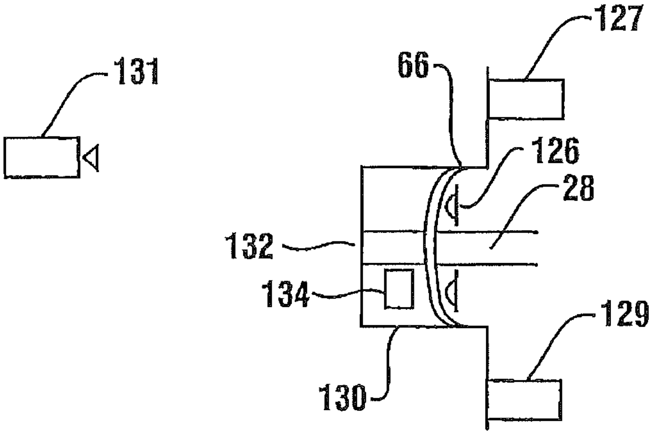
FIG. 10 is a schematic side view of an unauthorized card reading device in operative connection with a housing of the anti-fraud sensor.

As best shown in FIG. 7 in which the components supported in the upper housing are not shown, the delivery area 52 and the deposit acceptance area 58 are in supporting connection with the chest door 18. As such when the chest door 18 is opened, the delivery area 52 and the deposit acceptance area 58 will move relative to the housing of the machine. The exemplary embodiment shown facilitates servicing of the machine by providing for the illumination for the transaction areas by illumination sources positioned in supporting connection with the rollout tray 112. As best shown in FIG. 6, these illumination sources 118 are movable with the rollout tray and illuminate in generally a downward direction. In the operative position of the second fascia portion 22 and the chest door 18, the illumination sources are generally aligned with apertures 120 and 122 which extend through the top of a cover 124 which generally surrounds the recessed pockets 60 and 56. As shown in FIG. 10 aperture 120 is generally vertically aligned with window 68 and aperture 122 is generally aligned with window 70. In an exemplary embodiment apertures 120 and 122 each have a translucent or transparent lens positioned therein to minimize the risk of the introduction of dirt or other contaminants into the interior of the cover 124.

Figure 8:
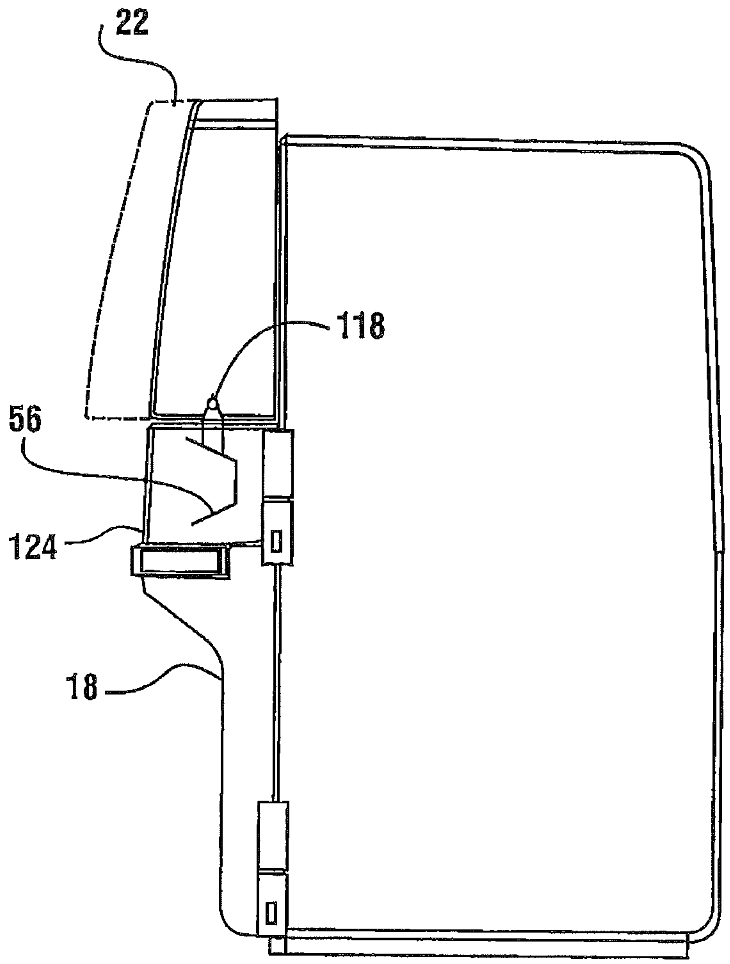
FIG. 8 is a schematic side view of the housing showing schematically the illumination system for the transaction areas and representing in phantom the movement of the upper fascia portion so as to provide access for servicing.

As can be appreciated from FIGS. 6 and 8, when the chest door 18 is closed and the second fascia portion 22 is moved to the operative position, the illumination sources 118 are positioned in generally aligned relation with apertures 120 and 122. As a result the illumination of the illumination devices is operative to cause light to be transmitted through the respective aperture and to illuminate the transaction area within the corresponding recessed pocket.

In operation of an exemplary embodiment, the controller executes programmed instructions so as to initiate illumination of each transaction area at appropriate times during the conduct of transactions. For example in the exemplary embodiment if the user is conducting a cash withdrawal transaction, the controller may initiate illumination of the delivery area 52 when the cash is delivered therein and is available to be taken by a user. Such illumination draws the user's attention to the need to remove the cash and will point out to the user that the cash is ready to be taken. In the exemplary embodiment the controller is programmed so that when the user takes the cash the machine will move to the next transaction step. After the cash is sensed as taken, the controller may operate to cease illumination of the delivery area 56. Of course these approaches are exemplary.

Likewise in an exemplary embodiment if a user of the machine indicates that they wish to conduct a deposit transaction, the controller may cause the machine to operate to initiate illumination of the deposit acceptance area 58. The user's attention is drawn to the place where they must insert the deposit envelope in order to have it be accepted in the machine. In the exemplary embodiment the controller may operate to also illuminate the illumination panel 62 to illuminate the deposit envelope providing opening 48 so that the user is also made aware of the location from which a deposit envelope may be provided. In an exemplary embodiment the controller may operate to cease illumination through the window 70 and/or the illumination panel 62 after the deposit envelope is indicated as being sensed within the machine.

In alternative embodiments other approaches may be taken. This may include for example drawing the customer's attention to the particular transaction area by changing the nature of the illumination in the recessed pocket to which the customer's attention is to be drawn. This may be done for example by changing the intensity of the light, flashing the light, changing the color of the light or doing other actions which may draw a user's attention to the appropriate transaction area. Alternatively or in addition, a sound emitter, vibration, projecting pins or other indicator may be provided for visually impaired users so as to indicate to them the appropriate transaction area to which the customer's attention is to be drawn. Of course these approaches are exemplary and in other embodiments other approaches may be used.

Figure 9:
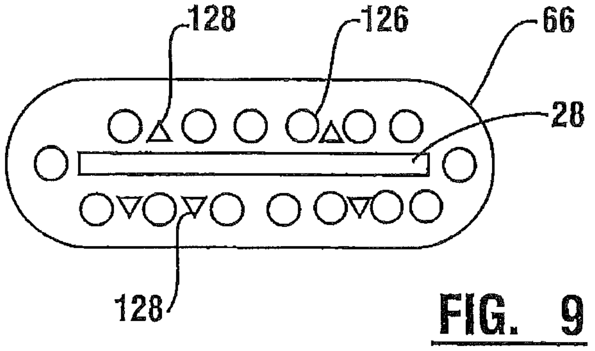
FIG. 9 is a schematic view of an illumination and anti-fraud sensing device which bounds a card reader slot of an exemplary embodiment.

As previously discussed the exemplary embodiment of ATM 10 is also operative to draw a user's attention at appropriate times to the card reader slot 28. ATM 10 also includes features to minimize the risk of unauthorized interception of card data by persons who may attempt to install a fraud device such as an unauthorized card reading device on the machine. As shown in FIG. 9, the exemplary card slot 28 extends through a card slot housing 66 which extends in generally surrounding relation of the card slot. It should be understood that although the housing 66 generally bounds the entire card slot, in other embodiments the principles described herein may be applied by bounding only one or more sides of a card slot as may be appropriate for detecting unauthorized card reading devices. Further, it should be understood that while the exemplary embodiment is described in connection with a card reader that accepts a card into the machine, the principles being described may be applied to types of card readers that do not accept a card into the machine, such as readers where a user draws the card through a slot, inserts and removes a card manually from a slot and other card reading structures.

In the exemplary embodiment the housing 66 includes a plurality of radiation emitting devices 126. The radiation emitting devices emit visible radiation which can be perceived by a user of the machine. However, in other embodiments the radiation emitting devices may include devices which emit nonvisible radiation such as infrared radiation, but which nonetheless can be used for sensing the presence of unauthorized card reading devices adjacent to the card slot. In the exemplary embodiment the controller operates to illuminate the radiation emitting devices 126 at appropriate times during the transaction sequence. This may include for example times during transactions when a user is prompted to input the card into the machine or alternatively when a user is prompted to take the card from the card slot 28. In various embodiments the controller may be programmed to provide solid illumination of the radiation emitting devices or may vary the intensity of the devices as appropriate to draw the user's attention to the card slot.

In the exemplary embodiment the card slot housing 66 includes therein one or more radiation sensing devices 128. The radiation sensing devices are positioned to detect changes in at least one property of the radiation reflected from the emitting devices 126. The sensing devices 128 are in operative connection with the controller. The controller is operative responsive to its programming to compare one or more values corresponding to the magnitude and/or other properties of radiation sensed by one or more of the sensors, to one or more stored values and to make a determination whether the comparison is such that there is a probable unauthorized card reading device installed on the fascia of the machine. In some embodiments the controller may be operative to execute fuzzy logic programming for purposes of determining whether the nature of the change in reflected radiation or other detected parameters are such that there has been an unauthorized device installed and whether appropriate personnel should be notified.

FIG. 10 shows a side view of the housing 66. An example of a fraud device which comprises unauthorized card reading device 130 is shown attached externally to the housing 66. The unauthorized card reading device includes a slot 132 generally aligned with slot 128. The device 130 also includes a sensor shown schematically as 134 which is operative to sense the encoded magnetic flux reversals which represent data on the magnetic stripe of a credit or debit card. As can be appreciated, an arrangement of the type shown in FIG. 10 enables the sensor 134 if properly aligned adjacent to the magnetic stripe of a card, to read the card data as the card passes in and out of slot 128. Such an unauthorized reading device may be connected via radio frequency (RF) or through inconspicuous wiring to other devices which enable interception of the card data. In some situations criminals may also endeavor to observe the input of the user's PIN corresponding to the card data so as to gain access to the account of the user.

As can be appreciated from FIG. 10 the installation of the unauthorized card reading device 130 changes the amount of radiation from emitting devices 126 and that is reflected or otherwise transmitted to the sensors 128. Depending on the nature of the device and its structure, the amount or other properties of radiation may increase or decrease. However, a detectable change will often occur in the magnitude or other properties of sensed radiation between a present transaction and a prior transaction which was conducted prior to an unauthorized card reading device being installed. Of course the sensing of the magnitude of radiation is but one example of a property of radiation that may be sensed as having changed so as to indicate the presence of an unauthorized reading device.

Figure 11:
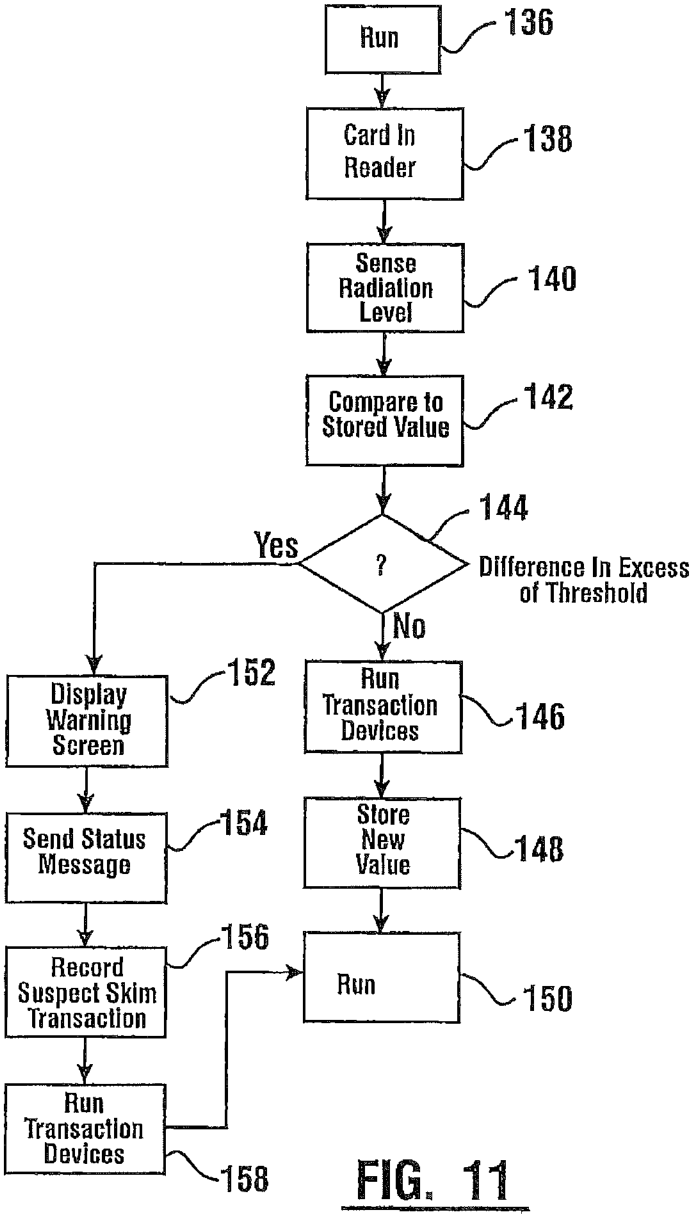
FIG. 11 is a schematic view of exemplary logic for purposes of detecting the presence of an unauthorized card reading device in proximity to the card reader during operation of the ATM.

FIG. 11 demonstrates an exemplary simplified logic flow executed by a controller for detecting the installation of an unauthorized card reading device. It should be understood that this transaction logic is part of the overall operation of the machine to carry out transactions. The exemplary logic flow is carried out through the execution of software instructions by at least one processor. The software instructions may be resident on any form of article which includes computer readable instructions such as a hard disk, floppy disk, semiconductor memory, CD, DVD, ROM or other article. In this exemplary logic flow the machine operates to carry out card reading transactions in a normal manner and to additionally execute the represented steps as a part of such logic each time a card is read. From an initial step 136 the controller in the machine is operative to sense that a card is in the reader within the machine in a step 138. Generally in these circumstances the controller will be operating the radiation emitting devices 126 as the user has inserted their card and the card has been drawn into the machine. In this exemplary embodiment the controller continues to operate the radiation emitting devices and senses the radiation level or levels sensed by one or more sensors 128. This is done in a step 140.

The controller is next operative to compare the signals corresponding to the sensed radiation levels to one or more values in a step 142. This comparison may be done a number of ways and may in some embodiments execute fuzzy logic so as to avoid giving false indications due to acceptable conditions such as a user having the user's finger adjacent to the card slot 28 during a portion of the transaction. In the case of a user's finger for example, the computer may determine whether an unauthorized reading device is installed based on the nature, magnitude and changes during a transaction in sensed radiation, along with appropriate programmed weighing factors. Of course various approaches may be used within the scope of the concept discussed herein. However, based on the one or more comparisons in step 142 the controller is operative to make a decision at step 144 as to whether the sensed value(s) compared to stored value(s) compared in step 142 have a difference that is in excess of one or more thresholds which suggest that an unauthorized card reading device has been installed.

If the comparison does not indicate a result that exceeds the threshold(s) the ATM transaction devices are run as normal as represented in a step 146. For example, a customer may be prompted to input a PIN, and if the card data and PIN are valid, the customer may be authorized to conduct a cash dispensing transaction through operation of the machine. Further in the exemplary embodiment, the controller may operate to adjust the stored values to some degree based on the more recent readings. This may be appropriate in order to compensate for the effects of dirt on the fascia or loss of intensity of the emitting devices or other factors. This is represented in a step 148. In step 148 the controller operates the ATM to conduct transaction steps in the usual manner as represented in a step 150.

If in step 144 the difference between the sensed and stored values exceeds the threshold(s), then this is indicative that an unauthorized card reading device may have been installed since the last transaction. In the exemplary embodiment when this occurs, the controller is operative to present a warning screen to the user as represented in a step 152. This warning screen may be operative to advise the user that an unauthorized object has been sensed adjacent to the card reader slot. This may warn a user for example that a problem is occurring. Alternatively if a user has inadvertently placed innocently some object adjacent to the card reader slot, then the user may withdraw it. In addition or in the alternative, further logic steps may be executed such as the machine prompting a user to indicate whether or not they can see the radiation emitting devices being illuminated adjacent to the card slot and prompting the user to provide an input to indicate if such items are visible. Additionally or in the alternative, the illuminating devices within the housing 66 may be operative to cause the emitting devices to output words or other symbols which a user can indicate that they can see or cannot see based on inputs provided as prompts from output devices of the machine. This may enable the machine to determine whether an unauthorized reading device has been installed or whether the sensed condition is due to other factors. It may also cause a user to note the existence of the reading device and remove it. Of course various approaches could be taken depending on the programming of the machine.

If an unauthorized reading device has been detected, the controller in the exemplary embodiment will also execute a step 154 in which a status message is sent to an appropriate service provider or other entity to indicate the suspected problem. This may be done for example through use of a system like that shown in U.S. Pat. No. 5,984,178 the disclosure of which is incorporated herein by reference. Alternatively messages may be sent to system addresses in a manner like that shown in U.S. Pat. No. 6,289,320 the disclosure of which is also incorporated herein by reference. In a step 156 the controller will also operate to record data identifying for the particular transaction in which there has been suspected interception of the card holder's card data. In addition or in the alternative, a message may be sent to the bank or other institution alerting them to watch for activity in the user's card account for purposes of detecting whether unauthorized use is occurring. Alternatively or in addition, some embodiments may include card readers that change, add or write data to a user's card in cases of suspected interception. Such changed data may be tracked or otherwise used to assure that only a card with the modified data is useable thereafter. Alternatively or in addition, in some embodiments the modified card may be moved in translated relation, moved irregularly or otherwise handled to reduce the risk that modified data is intercepted as the card is output from the machine. Of course these approaches are exemplary of many that may be employed.

In the exemplary embodiment the ATM is operated to conduct a transaction even in cases where it is suspected that an unauthorized card reading device has been installed. This is represented in a step 158. However, in other embodiments other approaches may be taken such as refusing to conduct the transaction. Other steps may also be taken such as capturing the user's card and advising the user that a new one will be issued. This approach may be used to minimize the risk that unauthorized transactions will be conducted with the card data as the card can be promptly invalidated. Of course other approaches may be taken depending on the programming of the machine and the desires of the system operator. In addition while the fraud device shown is an unauthorized card reading device, the principles described may also be used to detect other types of fraud devices such as for example false fascias, user interface covers and other devices.

In some embodiments additional or alternative features and methods may be employed to help detect the presence of unauthorized card reading devices or other attempted fraud devices in connection with the ATM. For example in some embodiments an oscillation sensor may be attached to the machine to detect changes in frequency or vibration that result from the installation of unauthorized devices on the ATM. FIG. 10 shows schematically an oscillator 127 attached to the interior surface of the ATM fascia. Oscillator 127 may be operative responsive to the controller and suitable vibration circuitry to impart vibratory motion to the fascia in the vicinity of the card reader slot. A sensor 129 is in operative connection with the fascia and is operative to sense at least one parameter of the motion imparted to the fascia by the oscillator 127. Although oscillator 127 and sensor 129 are shown as separate components, it should be understood that in some embodiments the functions of the components may be performed by a single device.

The sensor 129 is in operative connection with the controller of the ATM through appropriate circuitry. The controller selectively activates the oscillator and the sensor 129 is operative to sense the resulting movement of the fascia caused by the oscillation. The installation of an unauthorized card reading device or other fraud device on the ATM will generally result in a change in at least one property being sensed by the sensor 129. This may include changes in amplitude, frequency or both. Alternatively or in addition, some embodiments may provide for the oscillator to impart vibration characteristics of various types or vibratory motion through a range of frequencies and/or amplitudes. Sensed values for various oscillatory driving outputs may then be compared through operation of the controller to one or more previously stored values. Variances from prior values may be detected or analyzed through operation of the controller and notifications given in situations where a change has occurred which suggests the installation of an unauthorized device.

In some embodiments the controller may cause the oscillator and sensor to operate periodically to sense for installation of a possible unauthorized device. Alternatively, the controller may cause such a check to be made during each transaction. Alternatively in some embodiments oscillation testing may be conducted when a possible unauthorized device is detected by sensing radiation properties. The controller may operate to take various actions in response to sensing a possible unauthorized reading device through vibration, radiation or both. For example detecting a possible fraud device by both radiation and oscillation may warrant taking different actions than only detecting a possible fraud device through only one test or condition.

In some embodiments the controller may be programmed to adjust the thresholds or other limits used for resolving the presence of a possible fraud device for responses to changes that occur over time at the machine. This may include for example adjusting the thresholds for indicating possible fraud conditions based on the aging of the oscillator or the sensor. Such adjustments may also be based on parameters sensed by other sensors which effect vibration properties. These may include for example, the fascia temperature, air temperature, relative humidity and other properties. Of course readings from these and other sensors may be used to adjust thresholds of the oscillation sensor, radiation sensor or other fraud device sensors. Various approaches may be taken depending on the particular system.

In some embodiments the oscillator may additionally or alternatively be used to prevent the unauthorized reading of card reader signals. This may be done for example when the banking machine has a device which takes a user card into the machine for purposes of reading data on the card. In such embodiments the controller may operate to vibrate the area of the fascia adjacent to the card reader slot when a user's card is moving into and/or out of the slot. In such cases the vibration may be operative to cause the generation of noise or inaccurate reading by an unauthorized card reading sensor so as to make it more difficult to intercept the card stripe data using an unauthorized reading device. In some embodiments such vibration may also serve to disclose or make more apparent the presence of unauthorized card reading devices. Of course these approaches are exemplary and in other embodiments other approaches may be used.

In some exemplary embodiments provision may be made for detecting the presence of unauthorized input sensing devices for sensing a user's inputs through the keypad on the ATM. Such unauthorized input sensing devices may be used by criminals to sense the PIN input by the user. Detecting unauthorized devices may be accomplished by providing appropriate sensing devices in or adjacent to the keypad. Such sensing devices may be operative to detect that a structure has been placed over or adjacent to the keypad. Such sensors may be in operative connection with the controller in the machine or other devices which are operative to determine the probable installation of such an unauthorized input sensing device. In response to determining the probable installation of such a device, the controller may be operative in accordance with its programming to provide notification to appropriate entities, modify the operation of the machine such as to disable operation or prevent certain operations, or to take other appropriate actions.

Figure 12:
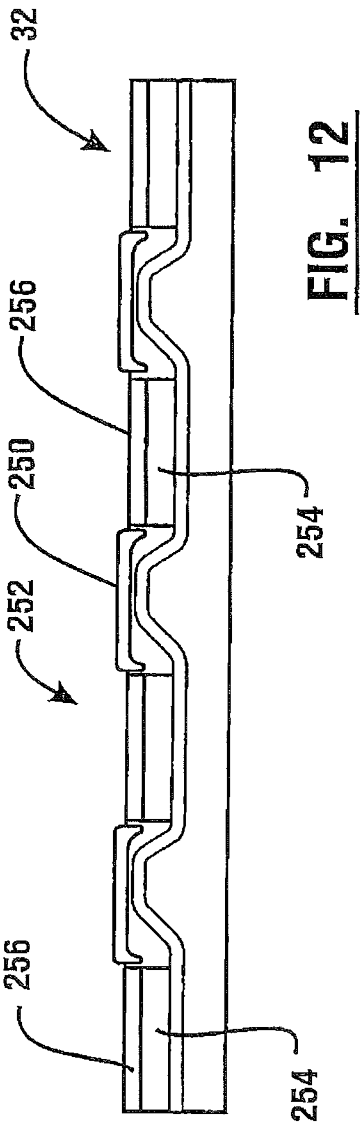
FIG. 12 is an exemplary side, cross sectional view of an ATM keypad.

FIG. 12 shows the cross-sectional view of exemplary keypad 32. Keypad 32 is shown schematically, and it should be understood that not all of the components of the keypad are represented. Keypad 32 includes a plurality of keys 250. Keys 250 are moveable responsive to pressure applied by a user's finger to provide an input corresponding to alphabetical or numerical characters. Extending between some of the keys 250 are areas or spaces 252. Extending in spaces 252 are sensors 254. In the exemplary embodiment the sensors 254 are radiation type sensors, but as previously discussed, in other embodiments other approaches may be used. Overlying the sensors 254 is an outer layer 256. In the exemplary embodiment, layer 256 is translucent or otherwise comprised of material so as to partially enable the transmission of radiation from the sensors therethrough.

Figure 13:
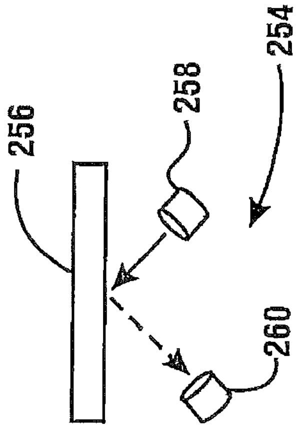
FIG. 13 is a schematic representation of a sensor for sensing whether an unauthorized key input sensing device has been placed adjacent to the keypad.

As represented in FIG. 13, the exemplary sensors 254 include a radiation emitter 258 and a radiation receiver 260. During operation the radiation emitter is operative to output radiation that is at least partially reflected from the inner surface of layer 256. The reflected radiation is received by the receiver 260. Corresponding electrical signals are produced by the receiver, and such signals are transmitted through appropriate circuitry so as to enable the controller to detect the changes in signals that correspond to probable presence of an unauthorized reading device.

Figure 14:
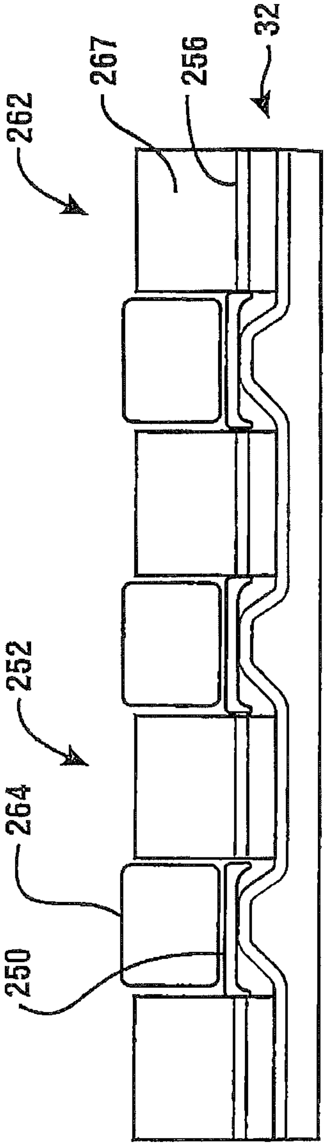
FIG. 14 is a view of a keypad similar to FIG. 12 but with an unauthorized key input sensing device attached.

FIG. 14 is a schematic view of an unauthorized input intercepting device 262 that has been positioned in overlying relation of a keypad 32. The input intercepting device 262 includes false keys 264 which are moveable and which are operatively connected to the corresponding keys 250 of the keypad. In the exemplary embodiment, input intercepting device 262 includes sensors which are operative to detect which of the false keys 264 have been depressed by a user. Because the depression of the false keys is operative to actuate the actual keys 250, the ATM is enabled to operate with the device 262 in place. Input intercepting device 262 in exemplary embodiments may include a wireless transmitter or other suitable device for transmitting the input signals to a criminal who may intercept such inputs.

Figure 15:
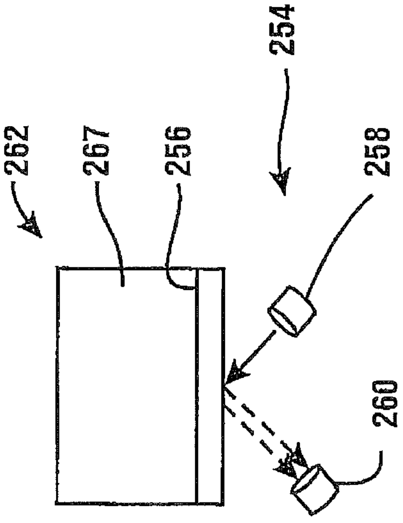
FIG. 15 is a schematic representation similar to FIG. 13, but representing the change in reflected radiation resulting from the attachment of the unauthorized key input sensing device.
Figure 19:
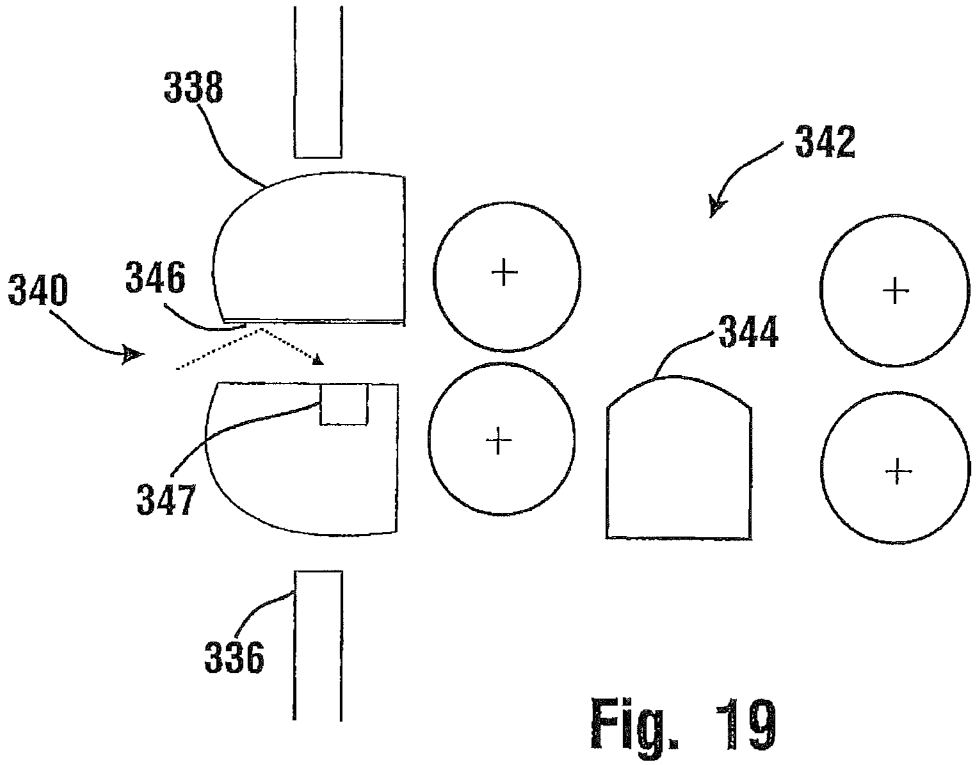
FIG. 19 is a schematic view of yet a further alternative embodiment of an anti-fraud device.

As represented in FIG. 19, the input intercepting device 262 includes portions 267 which extend in the areas 252 in overlying relation of layer 256. As represented in FIG. 15, the portion of the input intercepting device extending in overlying relation of the layer 256 is operative to cause a change in the amount of radiation from the emitter 258 that is reflected and sensed by the receiver 260 of the sensor. This is because the overlying portion will have different radiation reflecting or absorbing characteristics which will change the radiation reflective properties of the layer 256 compared to when no such input intercepting device is present. Thus the installation of the unauthorized input intercepting device can be detected.

In some exemplary embodiments the controller may be operative to sense the level of reflected radiation at the sensors periodically. This may be done, for example, between transactions when a user is not operating the terminal. This may avoid giving a false indication that an unauthorized input intercepting device has been installed when a user is resting a hand or some other item adjacent to the keypad during a transaction. Of course in other embodiments sensor readings can be taken and compared during transactions to prior values stored in a data store to determine if a change lasting longer than normal has occurred which suggests that an unauthorized input intercepting device has been installed rather than a user has temporarily placed their hand or some other item adjacent to the keypad. For example, in some exemplary embodiments the controller may not resolve that there is a probable unauthorized input intercepting device on the machine until a significant change from a prior condition is detected in the radiation properties adjacent to the keypad on several occasions both during a transaction and thereafter. Alternatively or in addition, a controller may be operative to determine that an improper device has been installed as a result of changes that occur during a time when no transactions have occurred. Alternatively in other embodiments, the controller may operate to sense and analyze signals from the sensors responsive to detecting inputs from other sensors, such as for example an ultrasonic sensor which senses that a person has moved adjacent to the machine but has not operated the machine to conduct a transaction. Of course these approaches are merely exemplary of many approaches that may be used.

It should be understood that although in the exemplary embodiment radiation type sensors are used for purposes of detection, in other embodiments other types of sensors may be used. These include, for example, inductance sensors, sonic sensors, RF sensors, or other types of sensing approaches that can be used to detect the presence of material in locations that suggest an unauthorized input intercepting device being positioned adjacent to the keypad. Further, in some embodiments the controller or other circuitry associated with the sensors may be operative to make adjustments for normal changes that may occur at the machine. These may include, for example, changes with time due to aging of emitters, the build up of dirt in the area adjacent to the keypad, weather conditions, moisture conditions, scratching of the surface of the sensing layer, or other conditions which may normally occur. Appropriate programs may be executed by the controller or other circuitry so as to recalibrate and/or compensate for such conditions as may occur over time while still enabling the detection of a rapid change which is sufficiently significant and of such duration so as to indicate the probable installation of an unauthorized input intercepting device. Of course these approaches are exemplary of many approaches that may be used.

In other embodiments other or additional approaches to detecting fraudulent reading or other improper activities may be used. For example, in some embodiments the fascia of the banking machine may be subject to observation within a field of view of one or more imaging devices such as camera 131 schematically represented in FIG. 10. Camera 15 may be in operative connection with an image capture system of the type shown in U.S. Pat. No. 6,583,813, the disclosure of which is incorporated herein by reference.

In some embodiments the controller and/or an image capture system may be operative to execute sequences of activities responsive to triggering events that may be associated with attempts to install or operate fraud devices. For example, the presence of a person in front of the banking machine may be sensed through image analysis, weight sensors, sonic detectors or other detectors. The person remaining in proximity to the machine for a selected period or remaining too long after a transaction may constitute a triggering event which is operative to cause the system to take actions in a programmed sequence. Such actions may include capturing images from one or more additional cameras and/or moving image data from one or more cameras from temporary to more permanent storage. The sequence may also include capturing image data from the fascia to try to detect tampering or improper devices. Radiation or vibration tests may also be conducted as part of a sequence. Notifications and/or images may also be sent to certain entities or system addresses. Of course these actions are exemplary.

In some exemplary embodiments the controller of the ATM or other connected computers may be operatively programmed to analyze conditions that are sensed and to determine based on the sensed conditions that a fraud device is installed. Such a programmed computer may be operative to apply certain rules such as to correlate the repeated sensing of abnormal conditions with a possible fraud or tampering condition and to conduct tests for the presence of fraud devices. Such events may constitute soft triggers for sequences or other actions to detect and reduce the risk of fraud devices. Of course these approaches are merely exemplary and in other embodiments other approaches may be used.

In some embodiments the ATM may include sensors adapted to intercept signals from unauthorized card readers or customer input intercepting devices. For example, some fraud devices may operate to transmit RF signals to a nearby receiver operated by a criminal. The presence of such RF signals in proximity to the ATM may be indicative of the installation of such a device. Such signals may be detected by appropriate circuitry and analyzed through operation of the ATM controller or other processor, and if it is determined that it is probable that such a device is installed, programmed actions may be taken.

For example, in some embodiments suitable RF shielding material may be applied to or in the fascia to reduce the level of RF interference from devices within the ATM at the exterior of the fascia. Antennas or other appropriate radiation sensing devices may be positioned adjacent to or installed on the fascia. A change in RF radiation in the vicinity of the fascia exterior may result upon the installation of an unauthorized device. The RF signals can be detected by receiver circuitry, and signals or data corresponding thereto input to a processor. In some embodiments the circuitry may also determine the frequency of the radiation sensed to be used in resolving if it is within the range emitted by legitimate devices such as cell phones of users operating the ATM. In other embodiments the circuitry may analyze the signals to determine if they are varying, and the circuitry and/or the processor may evaluate whether the changes in signal correspond to the input of a PIN or a card to the ATM.

In response to the sensed signal data, the processor may operate in accordance with its programming to evaluate the nature and character of the intercepted signals. For example, if the signals do not correspond to a legitimate source, such as a cell phone, the processor may operate to take actions such as to wholly or partially cease operation of the ATM, capture images with a camera, and/or notify an appropriate remote entity through operation of the ATM. Alternatively, the processor may compare the sensed RF signals to transaction activity at the ATM. If the sensed signals are determined to be varying in ways that correspond in a pattern or relationship to card or PIN inputs, for example, the processor may operate in accordance with its programming to cause the ATM or other devices to take appropriate programmed steps.

In still other exemplary embodiments the processor may be in operative connection with a RF emitter. The processor may operate in accordance with its programming to cause the emitter to generate RF signals that interfere with the detected signals. This can be done on a continuing basis or alternatively only at times during user operation of the ATM when user inputs are likely to be intercepted. For example, the processor controlling the emitter may operate the ATM or be in communication with a controller thereof. In such situations, the processor may operate to control the emitter to produce outputs at times when a user's card is moving into or out of a card slot, and/or when the ATM is accepting a user's PIN or other inputs. Thus, the emitter may be operative to produce interfering signals during relatively brief periods so as to not disrupt RF transmissions for an extended period in the event an incorrect determination is made and the RF signals are from a legitimate source.

In some embodiments an emitter may be a type that transmits on a plurality of frequencies intended to disrupt transmissions within the expected range of frequencies for a fraud device. In other embodiments the emitter may be controlled responsive to the processor to match the frequency or frequencies of suspect signals that have been detected. Of course these approaches are exemplary of approaches that may be used.

Figure 16:
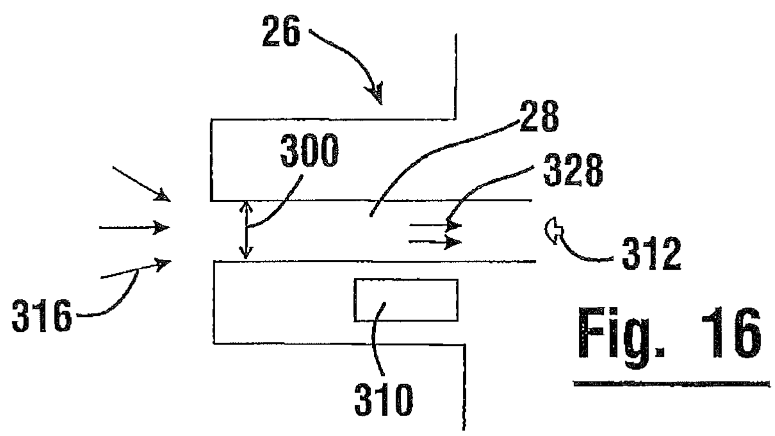
FIG. 16 is a schematic view of an anti-fraud device disposed within a slot of a card reader.
Figure 17:
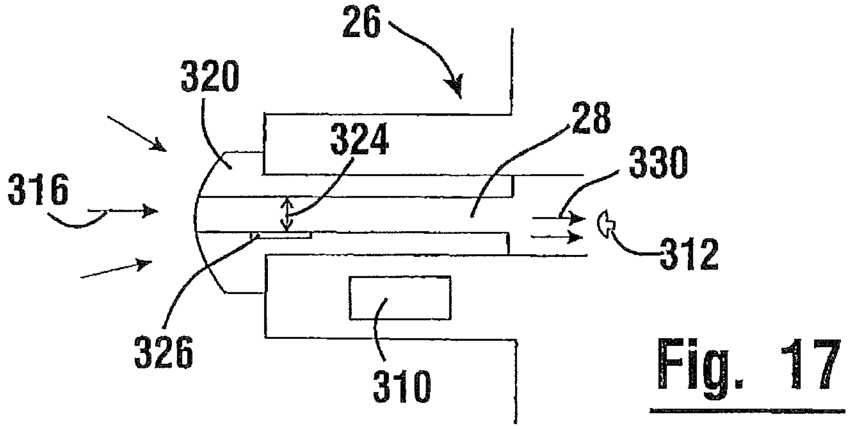
FIG. 17 is a schematic view of an unauthorized card reading device mounted adjacent the card reader.

An alternate exemplary embodiment is described with particular reference to FIGS. 16 and 17. In the exemplary embodiment, card reader 26, also shown schematically in FIG. 3, includes a card reader slot 28 defining a predetermined opening as indicated by arrow 300. The card reader includes component 310, such as a magnetic read head, operative to read data included on the magnetic stripe of a card such as a debit or credit card. The embodiment shown in FIG. 16 is merely exemplary, and it should be understood that the principles described herein are applicable to card readers that accept a card into the machine and to card readers that do not accept a card into the machine.

At least one sensing device also referred to as a sensor, schematically indicated 312, is positioned within an interior of the ATM adjacent the card slot 28. In one exemplary embodiment, the sensing device 312 is able to sense at least one property of radiation passing through the card reader slot 28 to the interior of the ATM and reaching the sensing device. For example, the sensing device 312 may be positioned so as to sense the intensity of ambient light that enters the slot from outside the ATM housing, as indicated by arrows 316. Of course it should be understood that the positioning of the sensing device is schematic only and in some embodiments the sensing device may comprise multiple sensing devices and may be located outside the card path. Alternatively, one or more radiation sensors may be mounted on a moving member that moves into the card path when a card is not present.

As represented in FIG. 17, in the event that an unauthorized card reading device 320 is positioned adjacent the card reader 26, the property sensed by the sensing device 312 will be altered. For example, a sensing device enabled to sense the intensity of ambient light entering the slot will detect a change in that property.

The unauthorized card reading device 320 may be positioned such that at least a portion of the unauthorized device extends in the slot 28 which effectively narrows the opening defined by the card reader slot 28, as illustrated by arrow 324. In the illustrated embodiment, the unauthorized card reading device 320 includes a fraudulent magnetic read head 326 used to skim data from a passing card stripe. The unauthorized card reading device 320 defines a narrower opening than the legitimate card slot 28 to cause the inserted card to be kept close to the fraudulent magnetic read head 326.

The narrowed opening reduces the amount of ambient light entering the slot 28, and ultimately the amount of light that passes through the slot and is detected by sensing device 312. The decrease in intensity of ambient light detectable by the sensing device is illustrated in FIGS. 16 and 17 by arrows 328, 330, respectively. In an exemplary embodiment, the sensing device 312 includes at least one photocell which is used to sense light as an integrator over area. The exemplary sensor configuration is generally not sensitive to dust due to its position within the machine interior. Of course, in other embodiments other approaches may be used.

In other embodiments an unauthorized card reading device may not necessarily have a narrower slot than the ATM's card reader slot. However the placement of the unauthorized card reading device will often result in a greater distance between the card opening to the unauthorized device outside the machine, and the at least one sensor inside the banking machine housing. This increased distance of the overall card slot, and longer light path results in the amount of light reaching the at least one sensor being reduced. Such a reduction in ambient light or other radiation can be monitored and sensed between transactions or at other times to detect when such a device is installed, for example. Of course, these approaches are exemplary.

Figure 18:
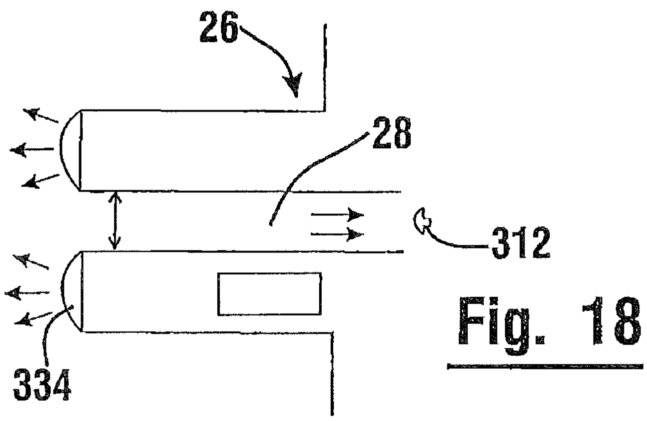
FIG. 18 is a schematic view of an alternate embodiment utilizing radiation emitters to emit radiation detectable by an anti-fraud device.

In an alternate embodiment, illustrated in FIG. 18, the property sensed by the sensing device 312 may be intensity of radiation emitted by one or more radiation emitters 334, such as LEDs, which are positioned to enable radiation emitted thereby to enter the slot 28 and be detected by sensing device 312. As will be readily appreciated, placement of an unauthorized card reading device adjacent the card reader impacts the detectable radiation.

The one or more radiation emitters 334 may operate substantially continuously, intermittently, or in accordance with transaction instructions as previously described. For example, the radiation emitters 334 may emit radiation responsive to operation of at least one controller in the machine when a user is instructed by the machine to insert a card into the card reader. The radiation is sensed by the sensing device. If an unauthorized card reading device has been positioned adjacent the card reader slot subsequent to a prior transaction, there is a detectable change in the property sensed by the sensing device. Further, in some embodiments a radiation guide, such as a fiber optic strand may extend from an area adjacent at least one emitter to an area adjacent the detector. Having the outside end of the strand located in the area where an unauthorized device would be attached may result in a greater change in sensed radiation to indicate the installation of an unauthorized card reading device. Of course this approach is exemplary.

In an exemplary embodiment, the sensing device 312 is in operative connection with at least one controller in the machine, as in previously described embodiments. With reference again to FIG. 11, the controller is operative responsive to its programming to compare one or more values corresponding to the sensed property to one or more stored values and make a determination as to the probability that an unauthorized card reading device 320 has been installed on the machine. Numerous factors and conditions may be used in making the determination. If an unauthorized card reading device is likely present, the controller generates at least one signal or otherwise enables the machine to take at least one action responsive to a change in the sensed property, as previously described. In an exemplary embodiment, the responsive action may include the activation of an oscillator 127, as shown in FIG. 10 and previously described. Alternatively, the controller may sense for an unauthorized source of Radio Frequency (RF) signals at the machine. Of course this is merely exemplary.

In still other embodiments the automated banking machine may include at least one light operated externally, such as a fascia light. The fascia light may provide a light level that is used to calculate a threshold of minimum light that can be expected to pass through the card slot when no card is present in the slot. The threshold can be used by the at least one controller to determine if the amount of radiation reaching the sensor is below the threshold. In such circumstances the at least one controller may be operative in accordance with its programming to generate at least the signal which can be used to indicate the likely presence of an unauthorized card reading device.

Of course in some embodiments the programming of the at least one controller is operative to compare the amount of light received at different times, such as between card reading transaction steps, to detect a change that corresponds to installation of an unauthorized card reading device. Alternately or in addition, the at least one controller may operate to monitor signals from the at least one sensor at times between transactions for changes which correspond to the installation of an unauthorized card reading device. In still other embodiments the at least one controller may be programmed to not identify certain changes as corresponding to the installation of an unauthorized reading device. This may include, for example, changes in radiation for card insertion, changes due to fingers placed against the slot by a user, such as a blind user, and other conditions that may cause a temporary drop in radiation sensed. In some embodiments the programming of the controller may disregard certain conditions based on the then-current operational status of the machine, such as receiving or delivering a card, for example. In some embodiments the at least one controller may execute fuzzy logic to determine events that correspond to installation of an unauthorized card reading device. Of course these approaches are merely exemplary.

In still other embodiments the card slot may be bounded by one or more light reflecting surfaces. Such light reflecting surfaces may be configured to facilitate detecting the installation of an unauthorized card reading device. For example, in some embodiments, multiple opposed side surfaces bounding a card slot may be comprised of reflective material. Such material may be operative to normally conduct more radiation through the slot from outside the machine to the at least one sensor within the machine housing. Therefore, in some embodiments this configuration may cause a greater reduction in radiation reaching the at least one sensor when an unauthorized card reading device is installed.

In still other embodiments the reflective surfaces may be tapered or otherwise contoured to facilitate detection of changes in radiation that result from an unauthorized card reading device. For example, in some embodiments one or more reflective surfaces may be contoured to increase the amount of light that passes through the card slot to the at least one sensor. However, in some embodiments one or more reflective surfaces may be contoured to reflect at least some light falling on the card slot so it does not reach the sensor. This may be useful in embodiments where the card slot is subject to exposure to a wide range of radiation levels, and restricting the radiation that reaches the at least one sensor facilitates identifying a change that indicates the installation of an unauthorized card reading device. In still other embodiments, reflective surfaces may facilitate directing radiation to at least one sensor within the machine. This may include using a contoured mirror surface that focuses visible radiation for example.

Further, in some embodiments a mirror surface may be used on only one side of the slot. This may be done, for example, to provide reflection of radiation on a side of a slot opposite the slot side adjacent magnetic stripes of cards. Thus an unauthorized card reading device is likely to be positioned at least on the slot side opposite of the reflective surface, which may reduce radiation reading the reflective surface. This may help in detecting certain types of unauthorized card reading devices. An example is shown in FIG. 19 which includes an ATM fascia surface 336 through which a card reader housing 338 extends. The card reader housing includes a card slot 340 through which cards pass. The card reader includes within the ATM, a card reader mechanism 342, which includes a read head 344. The mechanism operates responsive to at least one controller to selectively move magnetic stripe cards by engagement with the rollers shown, so that data in the stripe is read by the read head.

In this exemplary embodiment, at least one reflective surface 346 is positioned on a side of the slot opposed of the side of the slot which is adjacent the stripe on cards which pass through the slot. At least one sensor 347 is positioned on the side of the slot opposite the reflective surface. As can be appreciated, an unauthorized reading device will generally be positioned ahead of the opening to the card slot and will extend at least on the side of the slot on which magnetic stripes of cards are positioned. As can be appreciated from the arrow shown in phantom, an unauthorized card reading device in this position will generally reduce the amount of light reflected from surface 346 to the sensing device. As a result signals from the sensing device can be used by at least one controller to determine when an unauthorized card reading device has been installed. Of course these approaches are merely exemplary of approaches that may be used.

Figure 20:
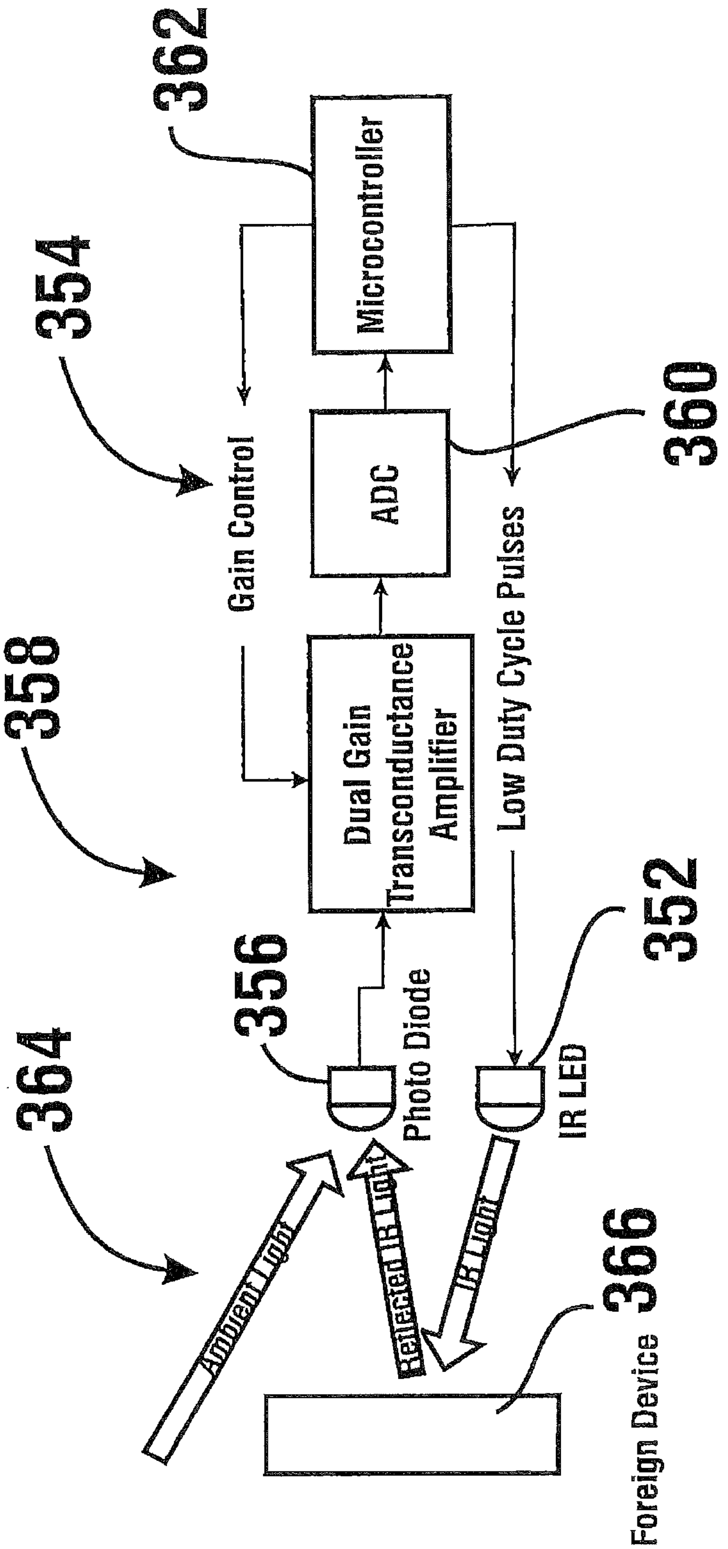
FIG. 20 is a schematic view of an exemplary apparatus for detecting the presence of an unauthorized device in connection with an ATM.

FIG. 20 shows an alternative embodiment which includes apparatus for detecting the presence of an unauthorized device adjacent a user transaction location on an automated banking machine. In some embodiments the user transaction location may include the area adjacent the card reader slot as previously discussed. Alternatively or in addition, the user transaction location may include all or a portion of a keypad on the automated banking machine. In still other embodiments the user transaction location monitored may include a cash outlet of the cash dispenser in the machine and through which cash is delivered to users. Other exemplary user transaction locations monitored may include a deposit opening through which deposits, envelopes, checks, cash or other items are accepted into the machine. In still other embodiments other user transaction locations may be monitored through use of the exemplary apparatus for the presence of an unauthorized device. Various user transaction locations on the automated banking machine that are monitored may include locations where items are input to the machine by users or delivered from the machine to users.

The exemplary apparatus 350 shown in FIG. 20 includes a radiation output device 352. The radiation output device emits radiation responsive to signals from control circuitry schematically indicated 354. In the exemplary embodiment the radiation output device includes an infrared (IR) light emitting diode (LED). It should be understood that although one radiation output device is shown which is of a particular type, alternative embodiments may include multiple radiation output devices of the IR type or radiation output devices of other types.

The apparatus also includes a radiation sensing device 356. In the exemplary embodiment the radiation sensing device comprises a photo diode suitable for sensing IR radiation. Of course it should be understood that in other embodiments other types and numbers of radiation sensing devices may be used.

The radiation sensing device 356 is also in operative connection with control circuitry 354. In the exemplary embodiment the control circuitry includes gain control circuitry schematically indicated 358. As discussed later in greater detail, the exemplary gain control circuitry is operative to amplify signals from the radiation sensing device in a manner which provides greater signal amplification when lower ambient light levels are being sensed. The exemplary control circuitry also includes circuitry 360 which is operative to convert the amplified analog signals to digital signals. The exemplary control circuitry also includes at least one controller 362. The controller includes at least one processor that operates in accordance with its associated programming. In some embodiments the controller may cause operation of other devices in the machine while in other embodiments the controller may be associated only with the radiation detection functions. Of course it should be understood that the gain control circuitry 354 is exemplary and in other embodiments other approaches may be used.

In the exemplary embodiment the infrared LED 352 in the photo diode 356 are positioned on the ATM physically close to each other and both face outward from the surface of the ATM at the user transaction location generally indicated 364. In the exemplary embodiment the control circuitry operates to cause the LED to output infrared pulses which have a duration of about 20 to 100 milliseconds. In the exemplary embodiment these pulses are output on an intermittent and regular periodic basis. Of course in other embodiments other approaches may be used.

In operation the exemplary control circuitry is operative to determine data corresponding to a level of radiation sensed by the photo diode 356 when the LED is off. The control circuitry is also operative to determine data corresponding to the magnitude of radiation that reaches the photo diode when the LED 352 is on. In this particular arrangement the amount of radiation generated by the LED 352 that is reflected to the photo diode 356 increases when an unauthorized device, schematically indicated 366 is installed on the ATM. Such a device may include for example an unauthorized card reading device of the types previously discussed. If an unauthorized device is present, the radiation pulses are generally reflected from the unauthorized device and are sensed by the photo diode. The amount of radiation reflected is often dependent on the distance that the unauthorized device is disposed from the radiation output device. The amount of reflected radiation is often also dependent on the material reflectivity of the unauthorized device as well as the particular geometry of the unauthorized device in the area adjacent the user transaction location. As a general proposition the closer the unauthorized device is positioned to the photo diode, the more infrared radiation that will be reflected to the photo diode. The greater magnitude of reflected radiation results in a larger output from the radiation sensing device 356.

In the exemplary embodiment the probable presence of the unauthorized device is determined by the control circuitry comparing the magnitude of the signal that results from the reflected radiation pulse, as well as such signal having an elevated magnitude that continues through a plurality of cycles and/or for at least a set time. In the exemplary embodiment if the elevated level of reflected radiation continues for a predetermined time period, then the control circuitry is operative to cause the automated banking machine to take at least one action. These actions may be of the type previously described, such as to conduct further analysis as to whether an unauthorized device is present. Alternatively or in addition, the control circuitry may be operative to provide at least one output indicative of an abnormal condition at the automated banking machine. Of course it should be understood that these approaches are exemplary.

Figure 22:
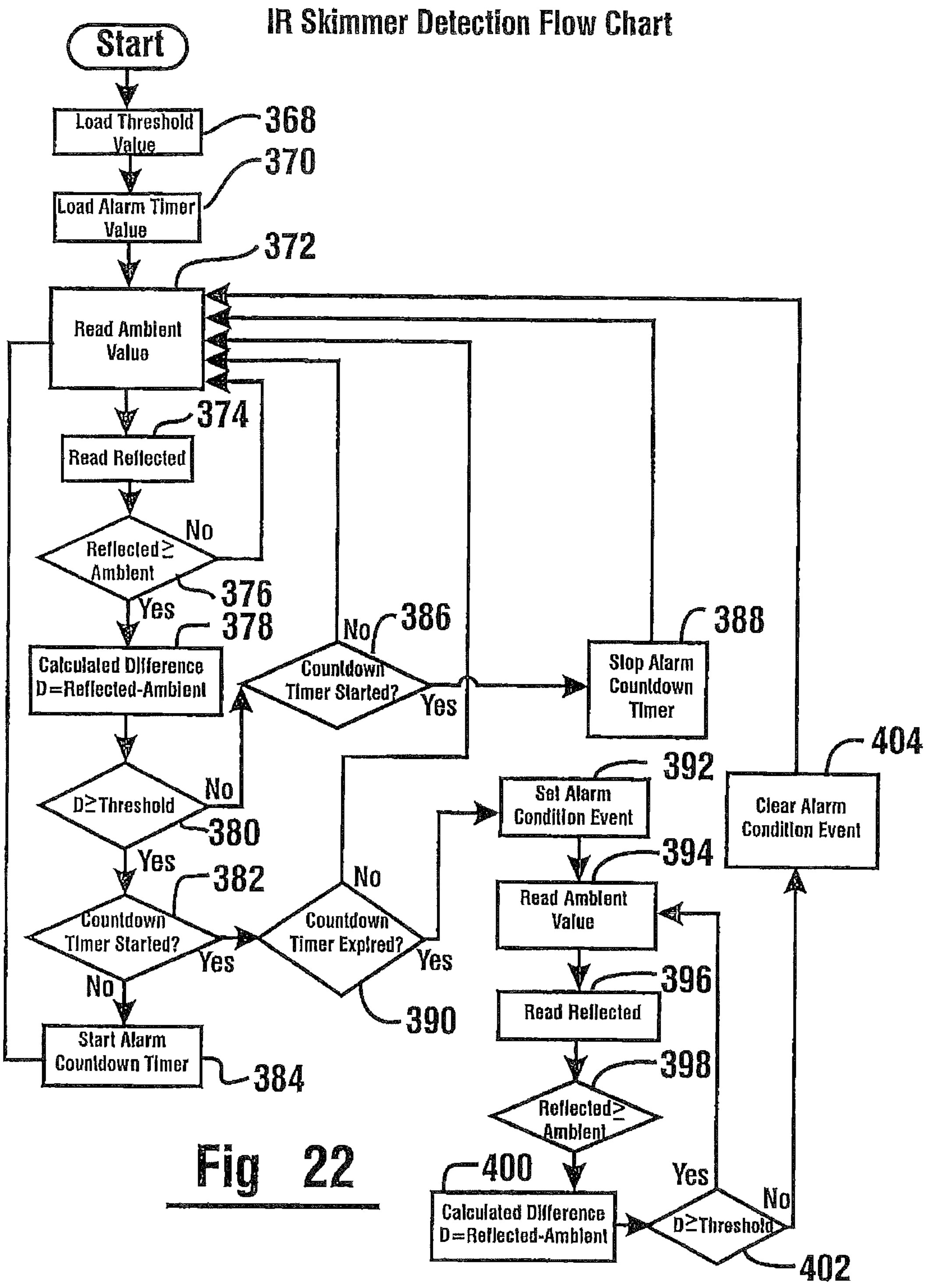
FIG. 22 is a schematic view of exemplary logic flow carried out in connection with the apparatus of FIG. 20.

FIG. 22 shows an exemplary schematic logic flow executed through operation of the at least one processor that is included with the control circuitry. The processor operates responsive to computer executable instructions. Prior to operation the at least one processor has stored in a memory associated therewith, at least one threshold value. This at least one threshold value is indicative of the level of radiation being reflected to the radiation sensing device relative to the ambient level of radiation, corresponding to a probable abnormal condition. The programming of this at least one threshold value is represented by a step 268. Also prior to operation, the memory associated with the at least one processor is programmed to include at least one timer value. This at least one time value corresponds to at least one time period. If during this time period the level of reflected IR radiation relative to the level of ambient IR radiation exceeds a threshold, the control circuitry is operative to determine that there is an abnormal condition which corresponds to the probable installation of a fraud device. This is represented in a step 370. Of course it should be understood that these steps are exemplary and in other embodiments data corresponding to radiation sensed by the radiation sensing device may be compared to multiple threshold values or conditions. Likewise in other embodiments other or additional time periods or logic values may be used to determine the probable presence of an abnormal condition. In still other embodiments time periods and threshold values may be variable and calculated by the at least one processor responsive to one or more sensed values or parameters.

In the exemplary embodiment, after loading the initial values in the memory the control circuitry operates in the manner discussed. The control circuitry determines data that corresponds to the level of ambient radiation reaching the photo diode at a time when the LED is not operating. This is represented in a step 372. The control circuitry through this step is operative to determine data at a first level that corresponds to the then current level of ambient radiation. The control circuitry then is operative to determine data that corresponds to the level of reflected radiation at a time while the LED is operated. This is represented by a step 374. The control circuitry then operates to determine in a step 376 if the data corresponding to the reflected radiation is at least as great as the level of ambient radiation. If not, the at least one processor returns to the logic flow step 372.

If in step 376 the level of radiation determined when the LED is operating is at least as great as the level of ambient radiation sensed, the control circuitry is operative to calculate a difference value. This is represented in a step 378. In the exemplary embodiment the difference value corresponds to the data corresponding to the level of radiation when the LED is operating minus the value corresponding to the level of radiation when the LED is not operating. In the exemplary embodiment, the calculation is done using the two immediately preceding values. However, it should be understood that in other embodiments other approaches may be used such as using averages of a plurality of preceding cycles, using a portion of the difference in magnitude values and/or using adjusted values that discard certain single abnormal data points (for example) for purposes of carrying out the calculation which corresponds to the difference in the radiation sensed compared to the level of ambient radiation.

In the exemplary embodiment the difference value calculated in step 378 is then compared to the programmed threshold stored in connection with the control circuitry in step 368. This comparison is executed in a step 380. In the exemplary step 380 the at least one processor is operative to determine if the difference value is at least as great as the threshold value. If so the at least one processor of the control circuitry checks in a step 382, to determine if a countdown timer function has been started. If not, the control circuitry operates to start the countdown timer in a step 384. In the exemplary embodiment the countdown timer is operative to determine if the difference value remains at least as great as the threshold for the stored set period of time. If it does then the control circuitry is operative to determine that an abnormal condition likely exists. Of course it should be understood that while in the exemplary embodiment time values are used for purposes of determining an abnormal condition. In other embodiments other approaches may be taken. These may include for example counting the number of cycles during which one or more difference values exceed one or more thresholds. These approaches may include for example a number of consecutive radiation output cycles, or alternatively the determination could be based on radiation values during a number of cycles within a given sample being in excess of a particular threshold. Also as previously discussed determinations may be based on multiple different thresholds and/or other parameters. Of course these approaches are exemplary.

As shown in FIG. 22, if in step 380 the difference value is not at least as great as the threshold, the control circuitry determines in a step 386 if the countdown timer has been started. If not, the process repeats and the ambient value is again determined. However, if in step 386 the countdown timer has been previously started and the different value is not above the threshold, a step 388 is executed in which the countdown timer is stopped. In these circumstances the control circuitry is no longer calculating a time period in which a condition exists continuously which suggests an abnormal condition. For example, it can be appreciated that in cases where users are operating devices on an automated banking machine, the user's fingers or other objects may cause radiation levels that are sensed to vary during relatively limited periods of time. However, in general these conditions which effect the sensed radiation levels are soon removed and the sensed radiation levels will return to a level consistent with normal operation of the machine. The exemplary embodiment of the control circuitry is able to deal with such circumstances by providing that a suspect condition must exist for a sufficient period of time before an abnormal condition at the machine is indicated. Of course this approach is exemplary.

In circumstances where in step 380 the difference value is at least as great as the threshold value, it is determined in step 382 that the countdown timer has already been started. In response to this condition a step 390 is carried out. In step 390 the control circuitry is operative to determine if the time period which corresponds to an abnormal condition has been reached. If not, the sensing process continues. However, if the difference value has been at least as great as the threshold value for the set time period as determined in step 390, the control circuitry is operative to set an alarm condition event. This is represented in a step 392. In the exemplary embodiment step 392 also includes the control circuitry operating to cause the machine to take at least one action. The at least one action may include for example, causing the at least one controller in the machine to take steps to determine if an improper device has been attached to the machine. Alternatively and/or in addition the control circuitry may operate to generate one or more signals which cause the banking machine to provide at least one output to indicate an abnormal condition. This at least one output may include for example, taking steps to make the machine inoperative or provide one or more outputs to inform users of the presence of a possible fraud device. Alternatively or in addition the at least one output may include the machine sending a message to another location or to an operator such as a bank or to a servicer entity that there is a problem with the machine. Of course these approaches are exemplary.

In operation of the exemplary control circuitry, even after an abnormal condition has been indicated, the control circuitry continues to operate to evaluate the radiation levels reaching the radiation sensing device. This is represented by a step 394. Thereafter the control circuitry is operative to determine a value corresponding to the level of radiation sensed while the LED is operating. This is represented in a step 396.

In the exemplary embodiment the control circuitry continues to operate to compare the data corresponding to the ambient values and the values while the emitter operates to determine if the data corresponding to the reflected value is at least as great as the ambient value. This is indicated in a step 398. A difference value is then calculated in a step 400 through subtraction of the data corresponding to the ambient value from the data corresponding to the sensed value when the LED is operating. Thereafter the difference value is compared to the threshold value to determine if the difference value is at least as great as the threshold. This is represented in a step 402.

In the exemplary embodiment the control circuitry is operative to provide at least one output to indicate that the abnormal condition which was previously determined has been cleared responsive to a negative determination in step 402. This is represented in a step 404. Of course in some exemplary embodiments at least one controller may operate to continue to send messages and provide outputs to indicate the probable abnormal condition. Likewise in still other exemplary embodiments, the at least one controller may operate responsive to other inputs or tests that it has carried out, to determine that an abnormal condition does not exist. Thereafter the at least one controller may operate in accordance with its programming to take steps to inform a remote servicer or other entity that there is not an abnormal condition at the machine. The remote servicer may check the machine remotely through messages that cause the machine to carry out additional tests for the presence of fraudulent devices and/or may view images from cameras adjacent to the machine. In still other exemplary embodiments other steps or actions may be taken to determine and/or clear the presence of unauthorized devices. Of course these approaches are exemplary.

Figure 21:
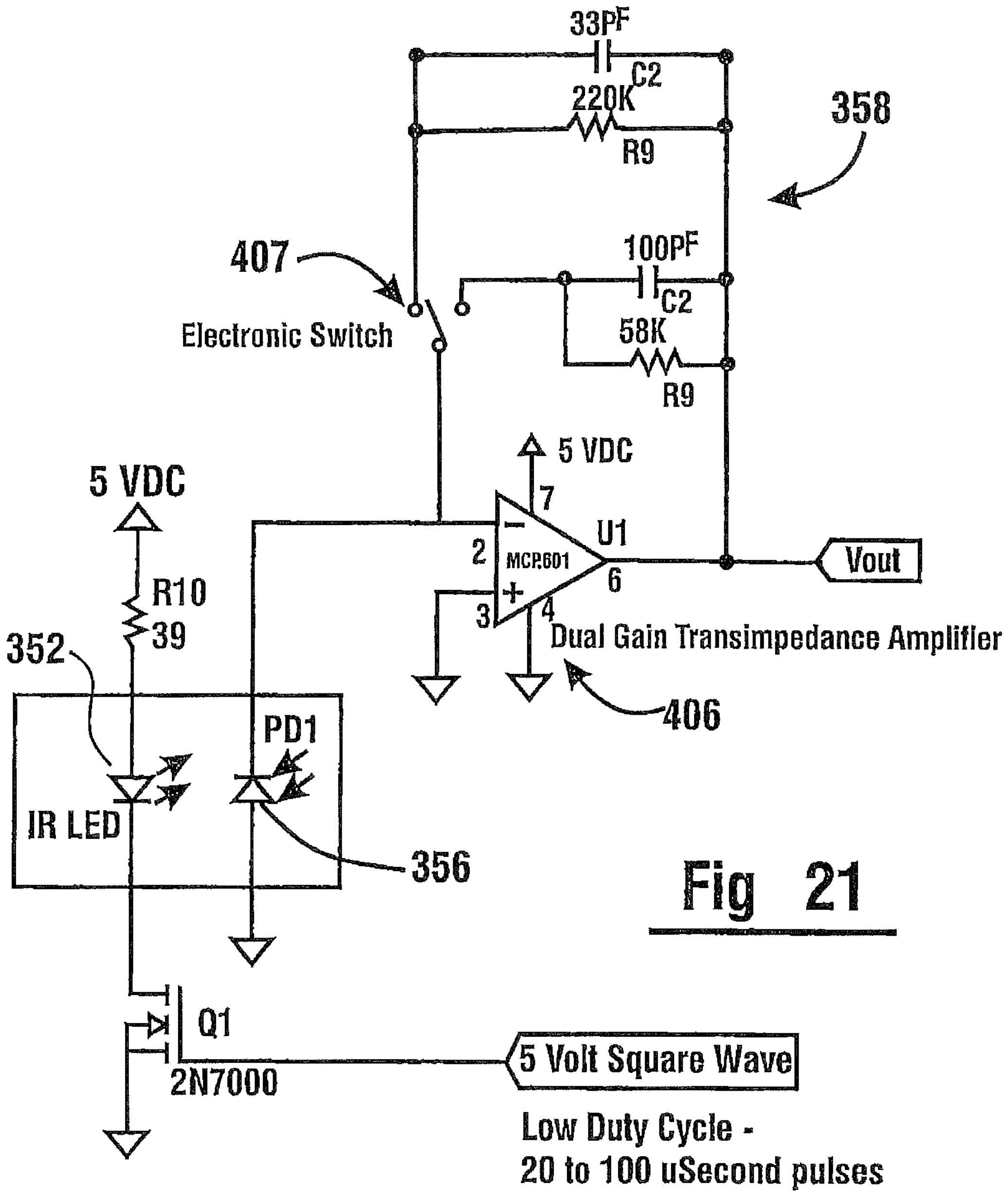
FIG. 21 is a schematic of exemplary gain circuitry used in connection with an exemplary radiation sensing device.

FIG. 21 shows an exemplary form of the control circuitry 358. In the exemplary embodiment the LED 352 is driven by a square wave signal responsive to the controller 362. As previously discussed, in the exemplary embodiment the radiation output device is operative to provide regular periodic intermittent pulses. These pulses are determined through the programming of the controller and may be of various durations. However, in the exemplary embodiment the pulses are set at a fixed duration. A suitable length of the duration for this particular embodiment has been found to be in a range of about 20 to 100 milliseconds.

In the exemplary embodiment a dual gain approach is used to provide greater sensitivity during times when the ambient radiation levels are relatively low. This may include for example operation of the automated banking machine in indoor or nighttime environments. The gain circuitry of exemplary embodiments includes a selectable dual gain transimpedence amplifier schematically indicated 406. In the exemplary embodiment, the gain which corresponds to the amount of amplification of the signal from the radiation sensing device is determined by selectively switching one of two possible gain impedences with the transimpedence amplifier feedback circuit. An electronic switch 407 is selectively operative responsive to the controller 362 to cause the dual gain transimpedence amplifier to provide higher gain and greater amplification of the signals from the photo diode responsive to the photo diode sensing ambient light levels at or below a particular threshold. Similarly responsive to the level of ambient light being determined as above the threshold the switch 407 is operated responsive to the controller to cause the lower gain for the photo diode signals to be provided.

This exemplary approach provides appropriate amplification based on the level of currently sensed ambient radiation and helps to assure that the presence of unauthorized devices may be more readily detected in lower ambient light level conditions. It should be understood however that the approach shown as exemplary. For example in other embodiments, other types of gain circuitry may be used such as those that provide a plurality of levels of gain responsive to ambient light and/or other parameters that are sensed. These may include for example, several different levels of amplification which correspond to particular conditions at the machine. Alternatively or in addition, other sensors may be used for purposes of determining radiation levels in other areas of the machine. Such signals from other sensors may be used by one or more controllers in the machine to make further evaluations as to possible abnormal conditions. Of course these approaches are exemplary and in other embodiments other approaches may be used.

Figure 23:
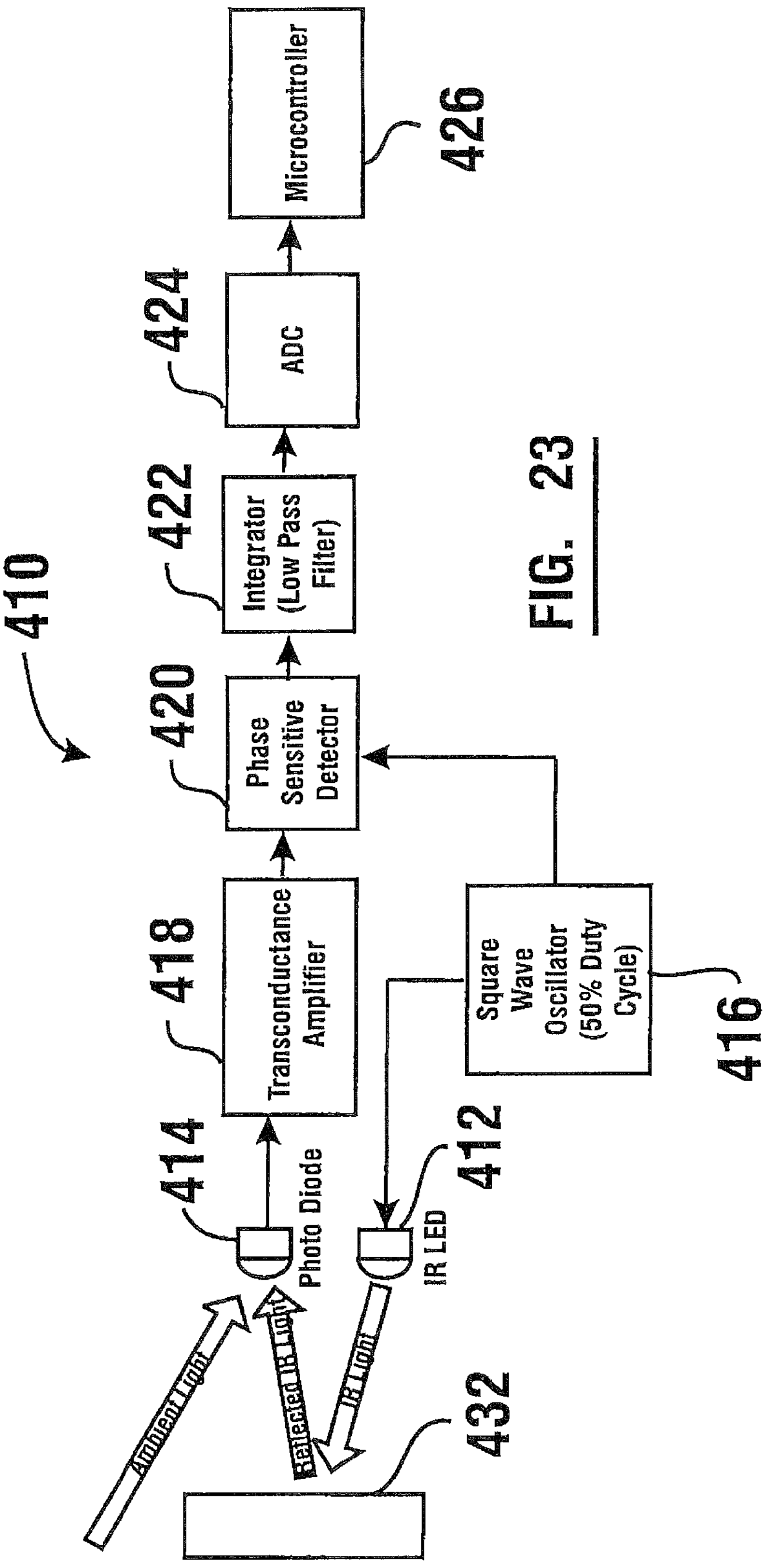
FIG. 23 is a schematic view of an alternative exemplary apparatus for detecting the presence of an unauthorized device in connection with an ATM.

FIG. 23 shows an alternative form of control circuitry generally indicated 410 which may be used in alternative embodiments of an automated banking machine which detects an unauthorized device at a transaction location on the machine. In the exemplary embodiment the circuitry may be part of the circuitry which is operative to control operation of an automated banking machines of the types previously described. Of course it should be understood that aspects of the exemplary embodiment may be used in other devices as well.

The exemplary arrangement includes at least one radiation output device which includes an infrared LED 412. The arrangement further includes at least one radiation detecting device which in the exemplary embodiment includes a photo diode 414. The photo diode 414 is operative to sense infrared radiation of the type output by LED 412. As represented schematically in FIG. 23 the exemplary embodiment includes driver circuitry that is operative to cause the LED 412 to output radiation. The driver circuitry of the exemplary embodiment is a square wave oscillator 416. The square wave oscillator causes the LED to output radiation periodically and on a fifty percent duty cycle. In an exemplary arrangement the LED is driven by a square wave signal and operates at a frequency of 10 KHz. Of course this approach is exemplary and in other embodiments other approaches may be used.

In the exemplary embodiment the photo diode is operative to output at least one signal corresponding to the magnitude of radiation sensed, to amplifier circuitry schematically indicated 418. The amplifier circuitry of the exemplary embodiment amplifies the signals from the photo diode, and the level of amplification determines sensitivity of the controller circuitry.

The exemplary amplifier 418 is operative to output one or more signals corresponding to radiation sensed, to phase sensitive detector circuitry schematically indicated 420. The phase sensitive detector circuitry is synchronized with a square wave oscillator 416. Circuitry 420 operates in the exemplary embodiment as a full wave rectifier that is sensitive to phase alignment of the input signal with the reference square wave that drives LED 412. As a result the circuitry 420 is operative to produce signals that correspond to the magnitude of radiation sensed during the time period that the LED is operating to output radiation. In addition, in the exemplary embodiment circuitry 420 is operative to attenuate the signals output therefrom in accordance with radiation that is sensed directly from the LED by the photo diode. This aspect is later discussed and enables the exemplary embodiment to produce sensed signals for each cycle that corresponds to radiation reflected from a possible unauthorized sensing device and to minimize the effects of possible direct sensing of radiation output from the LED. Of course these approaches are exemplary.

The sensor signals that are output from circuitry 420 are passed to circuitry 422. In the exemplary embodiment circuitry 422 includes an integrator/low pass filter. The integrator/low pass filter is operative to integrate sensed values corresponding to each of the sensor signals output from circuitry 420. Exemplary circuitry 422 integrates the demodulated signals over a defined time period. The defined time period in the exemplary embodiment comprises a plurality of cycles of the LED. The number of cycles over which the values are integrated may be selectively set for the particular circuitry to suit the particular machine arrangement and/or transaction location in which the sensing is conducted.

Circuitry 422 provides the values corresponding to the integrated output to an analog to digital converter schematically indicated 424. The analog to digital converter provides digital outputs to at least one processor 426. In the exemplary embodiment the processor is operative to compare the integrated value of the sensed values over a plurality of cycles, to one or more thresholds that are stored in memory associated with the processor. In situations where the at last one value received from the analog to digital converter 424 is in excess of a threshold, the at least one processor 426 operates in accordance with its programming to provide at least one output. This at least one output causes the controller or other devices in the automated banking machine to take at least one action. The at least one action may include for example, providing an alarm signal, notifying remote locations or taking other steps of the types previously described.

Figure 24:
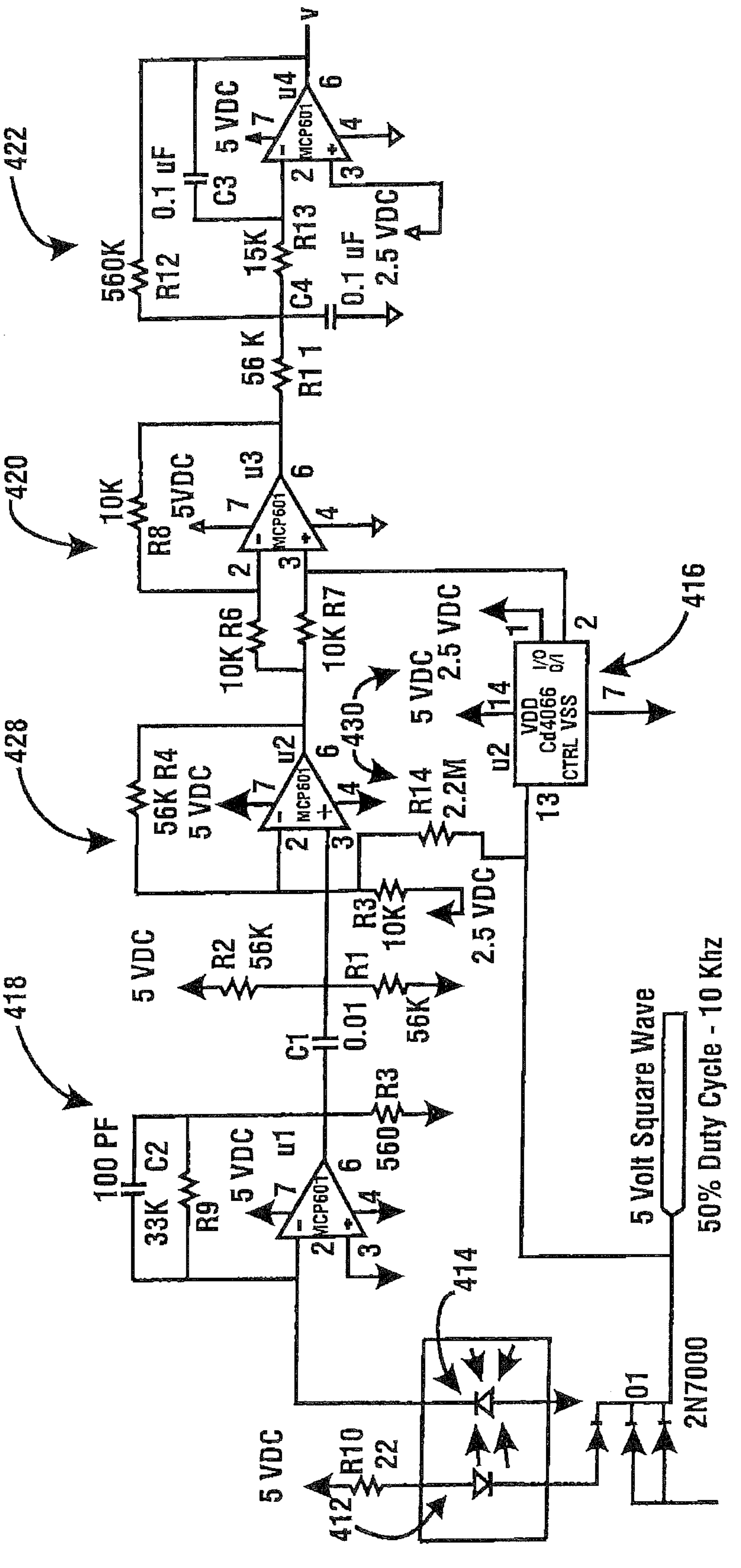
FIG. 24 is a schematic of exemplary circuitry used in connection with the exemplary apparatus of FIG. 23.

FIG. 24 shows exemplary circuitry which corresponds to the schematic shown in FIG. 23. In this exemplary embodiment the LED 412 operates to emit radiation intermittently during a desired period of operation in accordance with a fifty percent duty cycle. The transconductance amplifier 418 operates to amplify the signals from photo diode 414. This circuitry further includes a first stage amplifier 428 that is used to bias the signal. The first stage amplifier also has its input signal conditioned so as to subtract out the effect of radiation that is sensed directly from the LED by the further diode 414. This is accomplished in the exemplary circuitry through the use of a connection through the resistor designated 430. The circuitry helps to assure that the total output voltage swing is available for the signal output. The value of resistor 430 is selected to remove that portion of the "cross talk" that occurs between the particular configuration of the LED and photo diode. In the exemplary embodiment this avoids the need for light pipes or other devices to reduce the incidence of radiation directly from the LED reaching the photo diode. Of course this approach is exemplary and in other embodiments other approaches may be used.

In the exemplary embodiment the at least one controller in the automated banking machine operates to cause the machine to carry out transactions. A transaction location such as the card reader slot, to which the LED and photo diode are adjacent, is utilized in the operation of the machine to carry out a transaction function. As in the case of the other described embodiments, placement of an unauthorized device schematically indicated 432 in FIG. 23 causes the level of radiation output from the LED and reflected to the photo diode 414 to increase. This is a function of the particular configuration of the transaction location at which the system is used. The control circuitry is operative in this exemplary embodiment to produce signals corresponding to the sensed radiation only during the time periods that the LED operates to output radiation. The phase sensitive detector circuitry 420 operates to output a plurality of sensor signals, each corresponding to a particular cycle in which the LED outputs radiation. The values corresponding to the sensor signals is integrated by the circuitry 422 over a set comprising a plurality of cycles. This integration produces a value that is then output to the analog to digital converter 424. The comparison of this value is then made through operation of the processor 426 to at least one threshold. When the value is below the threshold the amount of reflected radiation is considered to be indicative that no abnormal condition exists because no unusual amount of radiation is being reflected to the photo diode.

In circumstances where the amount of reflected radiation increases, the at least one value produced by the circuitry will be in excess of a threshold. The processor 426 operates in accordance with its programmed instructions to output at least one signal. The at least one signal then causes at least one action by the ATM of the types previously discussed.

While in the exemplary embodiment the control circuitry operates to integrate sensed values for a plurality of sets of cycles which are gathered sequentially, in other embodiments other approaches to gathering data may be used. This may include for example, integrating sensed values for a plurality of cycles in which the cycles in the sets may substantially overlap. Thus for example if the period of integration is ten cycles, each set may overlap the other set by a plurality of cycles. Indeed in some embodiments the immediately succeeding set may overlap the immediately preceding set by all but one cycle. In this way some embodiments may provide for monitoring such that an abnormal condition is more rapidly detected.

In other exemplary embodiments provision may be made for including in a set sensed values, data corresponding to cycles that are not immediately adjacent. For example in some embodiments, sampling circuitry may be included such that values corresponding to one of each of several cycles, may be included in a set for purposes of producing at least one value. In this way the amount of data analyzed may be reduced, and in some embodiments the effects of temporary fluctuations in the amount of reflected radiation may be minimized so as to reduce the possibility of false alarms. As referred to herein however, in cases where a sampling of cycles is described as conducted for sensed values, those values that are sampled shall be considered immediately adjacent cycles even though the driving circuitry may operate to produce numerous radiation output cycles intermediate of those cycles for which radiation sensed is sampled.

Further while in the exemplary embodiment only one radiation output device and radiation sensing device are shown, other embodiments may include a plurality of either output devices and/or input devices. Also while in the exemplary embodiment the attenuation of sensed signals is accomplished through circuitry providing a fixed resistance, other embodiments may provide for variable resistance and more active attenuation. This may be done for example by including one or more sensors that operate to sense a degree of radiation which moves along a path directly between the one or more radiation output devices and radiation sensing devices. The outputs of such sensors may be used to provide active variable attenuation of the sensed signal. Of course other approaches may also be used.

In the exemplary embodiment the ATM 10 is provided with enhanced diagnostic capabilities as well as the ability for servicers to more readily perform remedial and preventive maintenance on the machine. This is accomplished in an exemplary embodiment by programming the controller and/or alternatively distributed controllers and processors associated with the transaction function devices, to sense and capture diagnostic data concerning the operation of the various transaction function devices. In an exemplary embodiment this diagnostic data may include more than an indication of a disabling malfunction. In some embodiments and with regard to some transaction function devices, the data may include for example instances of speed, intensity, deflection, vacuum, force, friction, pressure, sound, vibration, wear or other parameters that may be of significance for purposes of detecting conditions that may be developing with regard to the machine and the transaction function devices contained therein. The nature of the diagnostic data that may be obtained will depend on the particular transaction function devices and the capabilities thereof as well as the programming of the controllers within the machine.

The following applications and patents are incorporated herein by reference in their entirety: Provisional Application 60/853,098 filed Oct. 20, 2006; U.S. application Ser. No. 11/454,257 filed Jun. 16, 2006; U.S. application Ser. No. 10/832,960 filed Apr. 27, 2004; U.S. application Ser. No. 10/601,813 filed Jun. 23, 2003; Provisional Application 60/429,478 filed Nov. 26, 2002; and Provisional Application 60/560,674 filed Apr. 7, 2004.

Thus, the features and characteristics of the exemplary embodiments previously described achieve desirable results, eliminate difficulties encountered in the use of prior devices and systems, solve problems and may attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means known to those skilled in the art to be capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:

a transaction terminal including:

at least one reader, wherein the at least one reader includes a card reader, wherein the card reader is operable to read card data usable to identify a financial account, wherein the terminal is usable to conduct a financial transaction involving a financial account identified through use of card data read by the card reader, a user interface, wherein the user interface includes a card entry slot leading toward the card reader, at least one radiation output device adjacent the user interface, wherein the at least one radiation output device is operable to intermittently output radiation, at least one radiation sensor, wherein the at least one radiation sensor is operable to sense radiation output by the at least one radiation output device, at least one processor, wherein the at least one processor is operable to receive at least one signal corresponding to radiation sensed by the at least one radiation sensor, wherein the at least one processor is operable to determine responsive at least in part to the at least one signal received, whether the at least one radiation sensor sensed a predetermined level of radiation while the at least one radiation output device was outputting radiation, wherein the at least one processor is configured to cause responsive at least in part to a positive determination, the terminal take at least one predetermined action that is associated with detection of an unauthorized device adjacent the card entry slot.

2. The apparatus according to claim 1 wherein the transaction terminal comprises an automated banking machine, wherein the machine includes a cash dispenser, wherein the machine is operable to cause operation of the cash dispenser in carrying out an authorized cash dispense transaction involving a financial account, responsive at least in part to computer-determined correspondence between the financial account and card data read by the card reader.

3. The apparatus according to claim 2 wherein the automated banking machine is part of a banking system, wherein the at least one reader includes a biometric reader, wherein the at least one processor is operative to allow an authorized user to request a financial transaction involving the cash dispenser based at least in part on both computer-determined correspondence between card data read by the card reader and stored card information, and computer-determined correspondence between biometric data read by the biometric reader and stored biometric information, wherein the at least one processor is operative to cause data corresponding to at least a portion of at least one of the read card data and the read biometric data, to be sent in at least one first message to at least one computer remotely located from the machine, wherein the at least one processor is operative to cause cash to be dispensed from the machine responsive at least in part to receipt of at least one second message from the at least one computer.

4. The apparatus according to claim 1 wherein the fraud detection arrangement includes at least one signal emitter operable to emit interfering signals, wherein the at least one processor is operable to cause the at least one signal emitter to emit the interfering signals, wherein the at least one predetermined action includes causing the at least one signal emitter to emit the interfering signals.

5. The apparatus according to claim 1 wherein the at least one processor is operable to cause the at least one radiation output device to intermittently output radiation.

6. The apparatus according to claim 1 wherein the at least one radiation sensor is controllable to sense radiation only while the at least one radiation output device is outputting radiation.

7. Apparatus comprising:

a fraud detection arrangement adapted for use in detecting an unauthorized card data reading device located adjacent a card entry slot of a transaction terminal which includes a card reader associated with the card entry slot, and which is usable to conduct financial transactions involving financial accounts identified through use of card data read by the card reader, wherein the fraud detection arrangement includes at least one output device operable to generate outputs including at least one property, wherein the fraud detection arrangement includes at least one sensor, wherein the at least one sensor is positioned to sense the at least one property of outputs that were generated by the at least one output device and then reflected toward the at least one sensor, wherein the fraud detection arrangement includes at least one processor operatively connected with both the at least one output device and the at least one sensor, wherein the at least one processor is operable to cause the at least one output device to intermittently generate outputs, wherein the at least one processor is operable to receive at least one signal corresponding to the at least one property sensed by the at least one sensor, wherein the at least one processor is operable to determine responsive at least in part to the at least one signal received, whether the at least one sensor sensed a predetermined level of the at least one property while the at least one output device was generating outputs, wherein the at least one processor is configured to cause to be carried out responsive at least in part to a positive determination, at least one predetermined action associated with detection of an unauthorized card data reading device located adjacent the card entry slot.

8. The apparatus according to claim 7 wherein the transaction terminal comprises an automated banking machine, wherein the machine includes a cash dispenser, wherein the machine is operable to cause operation of the cash dispenser in carrying out an authorized cash dispense transaction involving a financial account, responsive at least in part to computer-determined correspondence between the financial account and card data read by the card reader.

9. The apparatus according to claim 7 wherein the outputs include radiation, wherein the at least one output device is operable to generate the radiation, wherein the at least one sensor is operable to sense radiation generated by the at least one output device, wherein the at least one processor is operable to receive at least one signal corresponding to radiation sensed by the at least one sensor, wherein the at least one processor is operable to determine responsive at least in part to the at least one signal received, whether the at least one sensor sensed a predetermined level of radiation, wherein the at least one processor is configured to cause responsive at least in part to a positive determination, the at least one predetermined action to be carried out.

10. The apparatus according to claim 7 wherein the fraud detection arrangement includes at least one signal emitter operable to emit interfering signals configured to interfere with unauthorized reading of card data by an unauthorized card data reading device located adjacent the card entry slot, wherein the at least one processor is operable to cause the at least one signal emitter to emit the interfering signals, wherein the at least one predetermined action includes causing the at least one signal emitter to emit the interfering signals.

11. The apparatus according to claim 7 wherein the at least one processor is operable to cause the at least one sensor to sense the at least one property of outputs only while the at least one output device is generating outputs.

12. Apparatus comprising:

a fraud detection arrangement adapted for use in detecting an unauthorized card data reading device located adjacent a card entry area of a transaction terminal which includes a card reader associated with the card entry area, and which is usable to conduct financial transactions involving financial accounts identified through use of card data read by the card reader, wherein the fraud detection arrangement includes at least one output device operable to emit outputs including at least one property, wherein the fraud detection arrangement includes at least one sensor operable to sense the at least one property of outputs emitted from the at least one output device, wherein the fraud detection arrangement includes at least one signal emitter operable to emit interfering signals, wherein the fraud detection arrangement includes at least one processor operatively connected with both the at least one output device and the at least one sensor, wherein the at least one processor is operable to cause the at least one signal emitter to emit the interfering signals, wherein the at least one processor is operable to cause the at least one output device to intermittently emit outputs, wherein the at least one processor is operable to receive at least one signal corresponding to the at least one property sensed by the at least one sensor, wherein the at least one processor is operable to determine responsive at least in part to the at least one signal received, whether the at least one sensor sensed a predetermined level of the at least one property, wherein the at least one processor is configured to cause responsive at least in part to a positive determination, at least one predetermined action associated with interfering with unauthorized reading of card data by an unauthorized card data reading device located adjacent the card entry area, wherein the at least one predetermined action includes causing the at least one signal emitter to emit the interfering signals.

13. The apparatus according to claim 12 wherein the transaction terminal comprises an automated banking machine, wherein the machine includes a cash dispenser, wherein the machine is operable to cause operation of the cash dispenser in carrying out an authorized cash dispense transaction involving a financial account, responsive at least in part to computer-determined correspondence between the financial account and card data read by the card reader.

14. The apparatus according to claim 12 wherein the outputs include radiation, wherein the at least one output device is operable to generate the radiation, wherein the at least one sensor is operable to sense radiation generated by the at least one output device, wherein the at least one processor is operable to receive at least one signal corresponding to radiation sensed by the at least one sensor, wherein the at least one processor is operable to determine responsive at least in part to the at least one signal received, whether the at least one sensor sensed a predetermined level of radiation, wherein the at least one processor is configured to cause responsive at least in part to a positive determination, the at least one signal emitter to emit the interfering signals.

15. The apparatus according to claim 14 wherein the at least one sensor is positioned to receive radiation that was generated by the at least one output device and then reflected toward the at least one sensor, wherein the at least one sensor is operable to sense reflected radiation that was generated by the at least one output device, wherein the at least one processor is operable to receive at least one signal corresponding to the reflected radiation sensed by the at least one sensor, wherein the at least one processor is operable to determine responsive at least in part to the at least one signal received, whether the at least one sensor sensed a predetermined level of reflected radiation, wherein the at least one processor is configured to cause the at least one signal emitter to emit the interfering signals responsive at least in part to a positive determination.

16. The apparatus according to claim 15 wherein the interfering signals are configured to interfere with unauthorized reading of card data by an unauthorized card data reading device located adjacent the card entry area.

17. The apparatus according to claim 12 wherein the at least one processor is operable to determine responsive at least in part to the at least one signal received, whether the at least one sensor sensed a predetermined level of the at least one property while the at least one output device was emitting outputs.

18. The apparatus according to claim 17 wherein the at least one processor is operable to cause the at least one sensor to sense the at least one property only while the at least one output device is emitting outputs.

19. The apparatus according to claim 12 wherein the at least one property comprises at least one magnitude, wherein the at least one sensor is operable to sense at least one magnitude of outputs that were emitted from the at least one output device, wherein the at least one processor is operable to receive at least one signal corresponding to the at least one magnitude sensed by the at least one sensor, wherein the at least one processor is operable to determine responsive at least in part to the at least one signal received, whether a level of the at least one magnitude sensed by the at least one sensor corresponds to a predetermined level of magnitude, wherein the at least one processor is configured to cause responsive at least in part to a positive determination, the at least one signal emitter to emit the interfering signals, wherein the interfering signals are configured to interfere with unauthorized reading of card data by an unauthorized card data reading device located adjacent the card entry area.

20. The apparatus according to claim 12 wherein the at least one sensor is positioned to receive outputs that were emitted from the at least one output device and then reflected toward the at least one sensor, wherein the at least one sensor is operable to sense the at least one property of reflected outputs emitted from the at least one output device, wherein the at least one processor is operable to receive at least one signal corresponding to the at least one property of reflected outputs sensed by the at least one sensor, wherein the at least one processor is operable to determine responsive at least in part to the at least one signal received, whether the at least one sensor sensed a predetermined level of the at least one property of reflected outputs, wherein the at least one processor is configured to cause the at least one signal emitter to emit the interfering signals responsive at least in part to a positive determination.

* * * * *